(12) United States Patent
Chaos-Provecho et al.

(10) Patent No.: US 12,265,936 B1
(45) Date of Patent: Apr. 1, 2025

(54) SYSTEMS AND METHODS TO ASSESS ENTITIES BASED ON CUSTOM RISK PROFILES DEFINED THROUGH A USER INTERFACE

(71) Applicant: SIMUR, INC., Grand Cayman (KY)

(72) Inventors: Javier Alejandro Chaos-Provecho, Madrid (ES); Don Seymour, West Bay (KY)

(73) Assignee: SIMUR, INC., Grand Cayman (KY)

( * ) Notice: Subject to any disclaimer, the term of this patent is extended or adjusted under 35 U.S.C. 154(b) by 0 days.

(21) Appl. No.: 18/322,363

(22) Filed: May 23, 2023

(51) Int. Cl.
*G06Q 10/0635* (2023.01)

(52) U.S. Cl.
CPC .............................. *G06Q 10/0635* (2013.01)

(58) Field of Classification Search
CPC ................................................. G06Q 10/0635
USPC ........................................................ 705/7.28
See application file for complete search history.

(56) References Cited

U.S. PATENT DOCUMENTS

| | | | |
|---|---|---|---|
| 6,542,515 B1 | 4/2003 | Kumar | |
| 6,757,720 B1 | 6/2004 | Weschler, Jr. | |
| 7,593,892 B2 | 9/2009 | Balk | |
| 7,899,722 B1 | 3/2011 | Lawrence | |
| 7,904,361 B2 | 3/2011 | Lawrence | |
| 8,019,691 B2 | 9/2011 | Dominguez | |
| 8,140,415 B2 | 3/2012 | Lawrence | |
| 8,209,246 B2 | 6/2012 | Lawrence | |
| 8,266,051 B2 | 9/2012 | Lawrence | |
| 8,831,972 B2 * | 9/2014 | Angell | G06Q 30/02 705/14.26 |
| 9,058,581 B2 * | 6/2015 | Lawrence | G06Q 40/08 |
| 9,934,544 B1 | 4/2018 | Whitfield | |
| 10,581,886 B1 | 3/2020 | Sharifi Mehr | |
| 10,915,960 B1 * | 2/2021 | Johnson | G06T 11/206 |
| 10,942,991 B1 | 3/2021 | Kidd | |
| 11,055,772 B1 * | 7/2021 | Ram | G06Q 40/03 |
| 11,132,460 B2 | 9/2021 | Chen | |
| 11,558,377 B2 | 1/2023 | Pointner | |
| 2004/0093334 A1 | 5/2004 | Scherer | |
| 2005/0027983 A1 * | 2/2005 | Klawon | G06F 21/31 713/168 |
| 2008/0028069 A1 | 1/2008 | Urbanek | |
| 2008/0059633 A1 | 3/2008 | Hu | |

(Continued)

FOREIGN PATENT DOCUMENTS

AU 2021101317 A4 * 5/2021
CN 105025032 A 11/2015

*Primary Examiner* — Abdallah A El-Hage Hassan
(74) *Attorney, Agent, or Firm* — Esplin & Associates, PC

(57) ABSTRACT

Systems and methods to assess entities based on custom risk profiles defined through a user interface are disclosed. Exemplary implementations may: obtain user profiles associated with users; generate user interface information defining a user interface through which risk profiles are defined by compliance organizations; effectuate communication of the user interface information to computing platforms associated with the compliance organizations; obtain user input information conveying user input into the instances of the user interface by the compliance organizations including definitions of valuation information and weighting information of individual risk profiles; obtain requests to verify the users; generate sets of weighted risk parameter values; generate aggregate risk parameter values; and/or perform other operations.

18 Claims, 7 Drawing Sheets

(56) References Cited

U.S. PATENT DOCUMENTS

| | | | |
|---|---|---|---|
| 2008/0288388 A1* | 11/2008 | Edison | G06Q 40/00 705/1.1 |
| 2009/0248465 A1* | 10/2009 | Recce | G06Q 40/03 705/38 |
| 2011/0113072 A1 | 5/2011 | Lee | |
| 2012/0036235 A1 | 2/2012 | Chan | |
| 2012/0143917 A1 | 6/2012 | Prabaker | |
| 2013/0024910 A1 | 1/2013 | Verma | |
| 2013/0080911 A1 | 3/2013 | Klemm | |
| 2013/0179988 A1 | 7/2013 | Bekker | |
| 2014/0279641 A1* | 9/2014 | Singh | G06Q 10/06 705/325 |
| 2015/0074101 A1 | 3/2015 | Solheim | |
| 2015/0135043 A1 | 5/2015 | Apps | |
| 2015/0163206 A1* | 6/2015 | McCarthy | G06F 21/6227 726/4 |
| 2016/0026717 A1 | 1/2016 | Kelsey | |
| 2016/0239658 A1 | 8/2016 | Loughlin-McHugh | |
| 2016/0277528 A1 | 9/2016 | Guilaume | |
| 2017/0017383 A1 | 1/2017 | Upadhyaya | |
| 2017/0140174 A1 | 5/2017 | Lacey | |
| 2017/0316515 A1 | 11/2017 | Varma | |
| 2018/0005239 A1 | 1/2018 | Schlesinger | |
| 2018/0157662 A1 | 6/2018 | Chin | |
| 2018/0165781 A1 | 6/2018 | Rodriguez | |
| 2018/0181964 A1 | 6/2018 | Zagarese | |
| 2019/0280862 A1 | 9/2019 | Crego | |
| 2019/0342175 A1 | 11/2019 | Wan | |
| 2020/0026834 A1 | 1/2020 | Vimadalal | |
| 2020/0074111 A1 | 3/2020 | Mitchell | |
| 2020/0177598 A1 | 6/2020 | Storr | |
| 2020/0242232 A1 | 7/2020 | Machani | |
| 2020/0366671 A1 | 11/2020 | Larson | |
| 2021/0019763 A1 | 1/2021 | Helles | |
| 2021/0075788 A1 | 3/2021 | Pasterk | |
| 2021/0195260 A1 | 6/2021 | Major | |
| 2021/0351927 A1 | 11/2021 | Gal | |
| 2021/0374749 A1 | 12/2021 | Vukich | |
| 2022/0035952 A1 | 2/2022 | Brannon | |
| 2022/0076262 A1 | 3/2022 | Boyd | |
| 2022/0122087 A1 | 4/2022 | Gosset | |
| 2022/0139535 A1 | 5/2022 | Kushnir | |
| 2022/0200937 A1 | 6/2022 | Bar-On | |
| 2022/0240095 A1 | 7/2022 | Kovac | |
| 2022/0300703 A1 | 9/2022 | Mcarthur | |
| 2022/0337443 A1 | 10/2022 | Sood | |
| 2022/0351284 A1 | 11/2022 | Cañón Paez | |
| 2022/0368685 A1 | 11/2022 | Pollack | |
| 2022/0414323 A1 | 12/2022 | Sreenivasan | |
| 2023/0061746 A1 | 3/2023 | Wei | |
| 2023/0080322 A1 | 3/2023 | Smith | |
| 2023/0145179 A1 | 5/2023 | Chen | |
| 2023/0199028 A1* | 6/2023 | Ho | G06F 16/2458 726/1 |
| 2023/0205833 A1 | 6/2023 | Rudra | |

* cited by examiner

SYSTEMS AND METHODS TO ASSESS ENTITIES BASED ON CUSTOM RISK PROFILES DEFINED THROUGH A USER INTERFACE

FIELD OF THE DISCLOSURE

The present disclosure relates to systems and methods to assess entities based on custom risk profiles defined through a user interface.

BACKGROUND

Financial and other institutions are regulated by strict due diligence procedures. By way of non-limiting illustration, a due diligence procedure referred to as Know Your Customer ("KYC") is a process that financial companies use to verify customer identity and assess and monitor risk factors for fraud and other financial crimes. KYC ensures a customer is who they say they are. For business customers, institutions follow Know Your Business ("KYB") procedures which allow companies to adhere to regulatory obligations with respect to verifying the identity of business customers and monitoring their risk. In the United States and elsewhere, these procedures are required for any financial institution that deals with customers while opening and maintaining financial accounts. Compliance with regulations helps prevent money laundering, terrorism financing, fraud schemes, and other crimes. By verifying a customer's identity and intentions when the account is opened, financial and other institutions can more accurately pinpoint suspicious clients and their activities.

SUMMARY

One or more aspects of the present disclosure address problems associated with current technology used by platforms that facilitate verification and/or risk assessment of potential customers by organizations that must comply with due diligence procedures. For the sake of this disclosure, an organization subject to obligatory compliance with one or more regulations (government or other) may be referred to as a "compliance organization."

Web-based platforms existing today may facilitate identification verification and/or risk assessment based on potential customers supplying personal information and/or documentation (e.g., driver's license, passport, etc.) which is electronically analyzed for authenticity. Typically, if a compliance organization is performing risk assessment of multiple potential customers (e.g., individual persons and/or business entities), the compliance organization may specify sets of criteria for each potential customer, therefore resulting in redundant submission and storage of information. In some traditional systems, the criteria may be pre-set or hardcoded, which may limit a platform's ability to assess risk in a manner which fits varying user needs.

One aspect of the present disclosure relates to a system configured to assess entities based on custom risk profiles defined through a user interface. One or more implementations of the system may address one or more of the problems described herein, and may include benefits and advantages that will become apparent to a person of ordinary skill in the art. In particular, one or more implementations of the systems and methods described herein solve one or more problems of existing technological solutions by leveraging specially configured user interfaces adapted to facilitate the custom risk profile definitions for automated risk assessments. The system may form a platform (e.g., a customer due diligence platform) through which users are verified/screened and assessed for risk by organizations that abide by, or otherwise must comply with, jurisdictional regulations and/or organizational standards ("compliance organizations"). Users (e.g., individual persons and business entities) may create profiles within the platform by supplying personal information and/or documentation which may be verified for authenticity through one or more automated procedures. Organizations may submit requests for documentation and/or other information about users as part of performing risk assessments.

The system may be configured to provide the organizations with requested authenticated documentation by accessing a database and securely passing that information/documentation to client devices associated with the organizations for display and review. The system may maintain a highly encrypted database(s) of user profiles including the underlying data and documentation. Any updates to user data may be stored and made current in the database(s). If user identification and/or other documents expire (and/or are deemed unacceptable), the system may be configured to automatically submit requests for updated documents from the users. Once uploaded, organizations who have been provided access to user data (information/documentation) as part of previous and/or ongoing requests may automatically receive access to the updated information/documentation for further display, review, and/or evaluation/reevaluation of risk. The compliance organizations may create and store risk profiles that define criteria upon which risk assessment is performed. The risk profiles may be reusable and customizable through a variety of measures. Risk profiles may be defined on a per-customer basis, allowing compliance organizations to define risk differently for different customers. For example, risk profiles for individual persons may be different from risk profiles for businesses. Further, risk assessment criteria may be defined with respect to one or more of particular documentation provided, information derived from the documentation, answers to specific questions, and/or other measures.

One or more implementations of a system to facilitate assessing entities based on custom risk profiles defined through a user interface may include one or more of non-transitory electronic storage, one or more hardware processors configured by machine-readable instructions, and/or other components. The non-transitory electronic storage may be configured to store one or more profiles, and/or other information.

The profiles may include one or more of user profiles, organization profiles, and/or other profiles. User profiles may be associated with users of the system who are being assessed for risk. Organization profiles may be associated with compliance organizations who are assessing users for risk because the compliance organizations abide by, or otherwise must comply with, jurisdictional regulations and/or organizational standards. In some implementations, a compliance organization may be a financial institution, such as a bank, while a user may be an individual or business entity who wishes to do business with the financial institution.

The individual user profiles may include user verification information describing individual users, one or more content items associated with individual users, one or more authenticated content items associated with individual users, and/or other information. The user verification information may include attribute values for user attributes. The user attributes may characterize the users and/or content items associated with the users. By way of non-limiting illustration, the user profiles may include a first user profile associated with a first user. The first user profile may include one or more of a first attribute value for a first user attribute, a second attribute value for a second user attribute, and/or other information.

The processor(s) may be configured to generate user interface information defining a user interface through which risk profiles may be defined by compliance organizations. Individual risk profiles may include one or more of valuation information, weighting information, and/or other information. The valuation information may include risk parameter values for one or more risk parameters assigned to the user profiles as a function of attribute values for user attributes within the user profiles. The weighting information may include different weights associated with individual risk parameters.

The processor(s) may be configured to effectuate communication of the user interface information to computing platforms associated with the compliance organizations to cause the computing platforms to present instances of the user interface. By way of non-limiting illustration, the user interface information may be communicated to a first computing platform associated with a first compliance organization to cause the first computing platform to present an instance of the user interface through which the first compliance organization defines a first risk profile.

The processor(s) may be configured to obtain user input information and/or other information. The user input information may convey user input into the instances of the user interface by the compliance organizations. The user input may include definitions of one or more of the valuation information, the weighting information, and/or other information making up the individual risk profiles. By way of non-limiting illustration, the user input information may convey first user input into the instance of the user interface by the first compliance organization. The first user input may include definition of one or more of first valuation information, first weighting information, and/or other information making up the first risk profile. The first valuation information may include a first risk parameter value for a first risk parameter that is assigned as a function of the first user attribute having the first attribute value and/or other values. The first valuation information may include a second risk parameter value for a second risk parameter that is assigned as a function of the second user attribute having the second attribute value and/or other values. The first weighting information may include one or more of a first weight associated with the first risk parameter, a second weight associated with the second risk parameter, and/or other weights.

The processor(s) may be configured to obtain requests to verify the users. Individual requests may identify individual ones of the user profiles. Individual requests may include request criteria indicating information from the user profiles that may be required as part of the individual requests. By way of non-limiting illustration, the requests may include a first request by the first compliance organization. The first request may identify the first user profile and include a first set of request criteria. The first set of request criteria may indicate that attribute values for the first user attribute, the second user attribute, and/or other user attributes are required as part of the first request.

The processor(s) may be configured to generate sets of weighted risk parameter values for the user profiles. The sets of weighted risk parameter values may be generated in response to obtaining the requests and/or in response to other events. The sets of weighted risk parameter values may be generated based on one or more of the risk profiles, the information from the user profiles that satisfy the request criteria of the requests, and/or other information. By way of non-limiting illustration, a first weighted risk parameter value and a second weighted risk parameter value may be generated for the first user profile. The first weighted risk parameter value may be generated based on the first risk parameter value and the first weight by virtue of the first user profile having the first attribute value for the first user attribute. The second weighted risk parameter value may be generated based on the second risk parameter value and the second weight by virtue of the first user profile having the second attribute value for the second user attribute.

The processor(s) may be configured to generate aggregate risk parameter values for the user profiles by aggregating the weighted risk parameter values and/or performing other operations. By way of non-limiting illustration, a first aggregate risk parameter value may be generated from one or more of the first weighted risk parameter value, the second weighted risk parameter value, and/or other values.

As used herein, any association (or relation, or reflection, or indication, or correspondence) involving servers, processors, client computing platforms, and/or another entity or object that interacts with any part of the system and/or plays a part in the operation of the system, may be a one-to-one association, a one-to-many association, a many-to-one association, and/or a many-to-many association or N-to-M association (note that N and M may be different numbers greater than 1).

As used herein, the term "obtain" (and derivatives thereof) may include active and/or passive retrieval, determination, derivation, transfer, upload, download, submission, and/or exchange of information, and/or any combination thereof. As used herein, the term "effectuate" (and derivatives thereof) may include active and/or passive causation of any effect. As used herein, the term "determine" (and derivatives thereof) may include measure, calculate, compute, estimate, approximate, generate, and/or otherwise derive, and/or any combination thereof.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
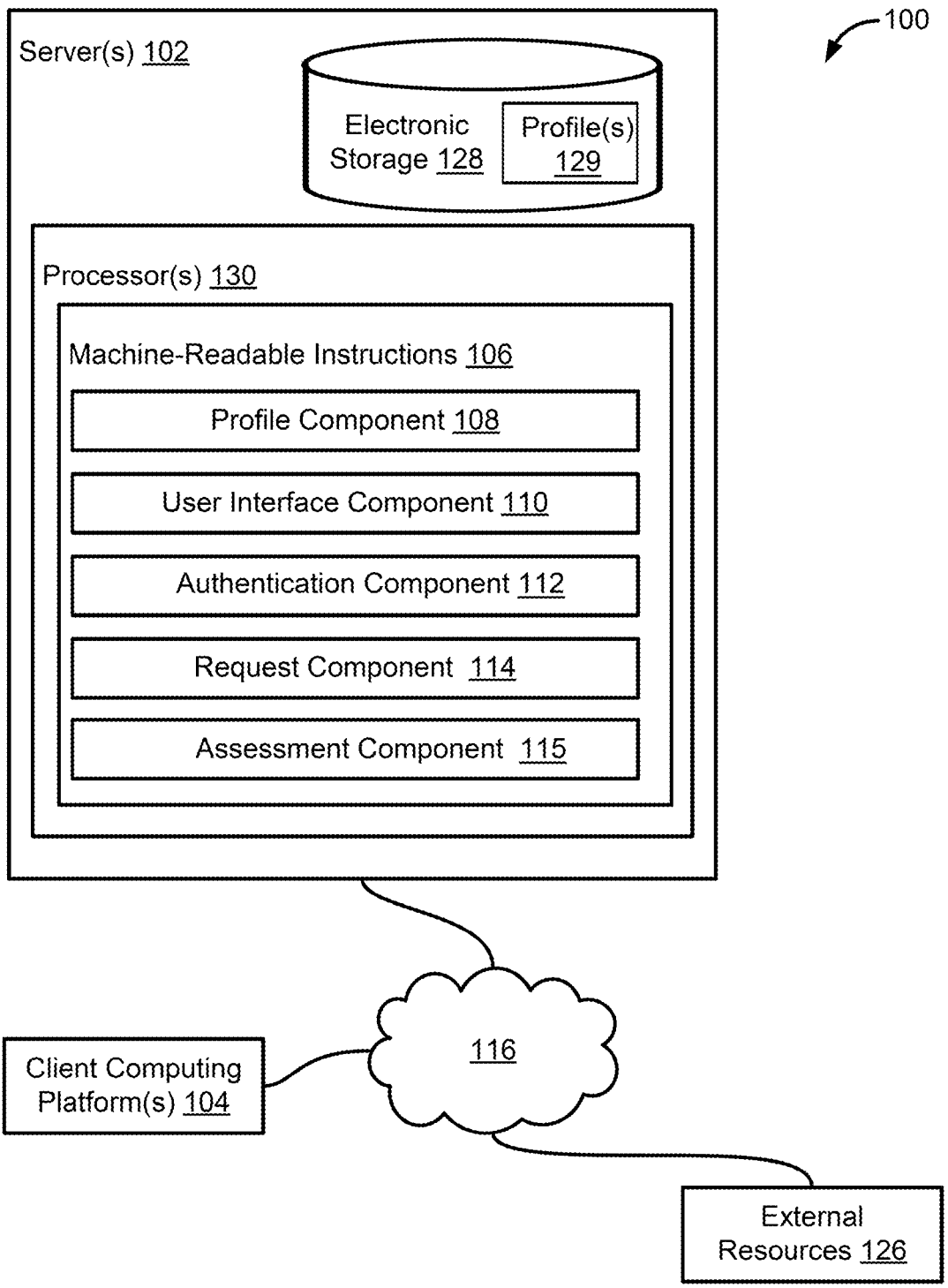
FIG. 1 illustrates a system configured to assess entities based on custom risk profiles defined through a user interface, in accordance with one or more implementations.

FIG. 1 illustrates a system 100 configured to facilitate automated assessment of entities based on custom risk profiles defined through a user interface, in accordance with one or more implementations. Users of the system 100 who are compliance organizations may submit requests for documentation and/or other information about other users of the system that are the subject of identity verification and/or risk assessment. The system 100 may be configured to provide the organizations with requested authenticated documentation by accessing a database and securely passing that information/documentation to the organizations for display and review at client devices. The system 100 may be configured to maintain a highly encrypted database of user profiles including underlying user data and authenticated documentation. Compliance organizations may define one or more risk profiles that can be selected and used to automatically and dynamically assess risk based on information from user profiles and/or other user-supplied information.

In some implementations, system 100 may include one or more of one or more servers 102, one or more client computing platforms 104, external resources 126, and/or other components. Server(s) 102 may be configured to communicate with one or more client computing platforms 104 according to a client/server architecture and/or other architectures. Client computing platform(s) 104 may be configured to communicate with other client computing platforms via server(s) 102 and/or according to a peer-to-peer architecture and/or other architectures. Users may access system 100 via client computing platform(s) 104. It is noted that while both compliance organizations and entities subject to identity verification and/or risk assessment are both "users" of the system 100 (e.g., both may interact with the system 100 and/or each other, and/or impact aspects of the system 100), in some implementations the term "users" may be used refer to the entities subject to identity verification and/or risk assessment, while the compliance organizations may be referred to as "compliance organizations" or "organizations."

Server(s) 102 may include one or more of non-transitory electronic storage 128, one or more processors 130 configured by machine-readable instructions 106, and/or other components. The non-transitory electronic storage 128 may be configured to store one or more profiles 129. The profile(s) 129 may include one or more of user profiles, organization profiles, and/or other information. User profiles may be associated with users of the system who are being assessed for risk. Organization profiles may be associated with compliance organizations who are assessing users for risk because the compliance organizations abide by, or otherwise must comply with, jurisdictional regulations and/or organizational rules standards.

In some implementations, a compliance organization may be a financial institution and/or other institution or organization subject to jurisdictional regulation and/or organizational rules and standards (self-imposed or otherwise). By way of non-limiting illustration, a compliance organization may comprise a bank. A user may be an individual or business entity who wishes to do business with a compliance organization (e.g., employ the services of the compliance organization) and will thereafter be the subject of the compliance organization's compliance procedure. By way of non-limiting illustration, a user may be a potential customer. The user may comprise an individual person or a business entity. A business entity may comprise an organization formed to conduct business (e.g., sole proprietorships, partnerships, corporations, limited liability companies (LLCs), etc.). A business entity may itself be made up of individuals including, but not limited to, members, partners, shareholders, and/or other individuals. A business entity may create a user profile representing the business entity as a whole, while individuals making up a business entity may individually create user profiles.

Individual user profiles may include one or more of user information associated with and/or otherwise describing individual users (sometimes referred to as "user verification information"), one or more authenticated content items associated with individual users, and/or other information. In some implementations, content of the user profiles may be derived from content items provided by the users (e.g., information captured from uploaded documentation). In some implementations, content of the user profiles may be input by the users during creation of the user profiles and/or on an ongoing basis to maintain up-to-date information. In some implementations, users may be prompted with questions related to inputting information into their user profiles. Responses to the questions may become part of the user profiles.

The user verification information may define attribute values of user attributes and/or other information. The values of the user attributes may characterize one or more of the users, authenticated content items associated with the users, authentication requests associated with the users, and/or other information related to the users. The user attributes describing characteristics of the users may include one or more of an entity type attribute, a name attribute, a demographics attribute, a location attribute, a contact attribute, and/or other attributes. The user attributes describing authentication requests associated with the users may include one or more of a requestor attribute, a document attribute, a status attribute, a timing attribute, and/or other attributes.

A value of an entity type attribute may define the entity type of the user. Entity types may include one or more of individual person, business entity, and/or other information.

A value of a name attribute may define a name characteristic of a user. A name characteristic of an individual may include one or more of a legal name, a preferred name, a nickname, alias(es), and/or other information. A name characteristic of a business entity may include one or more of full business name, a stock listing name/symbol, and/or other information.

A value of a demographics attribute may define demographic characteristics of a user. A demographic characteristic of an individual may include one or more of age, sex, occupation, cultural background, family status, and/or other information. A demographics characteristic of a business entity may include one or more of entity type (e.g., sole proprietorship, LLC, etc.) and/or other information.

A value of a location attribute may define a location characteristic of a user. A location characteristic of an individual may include one or more addresses (e.g., residence address), legal jurisdictions, length of residence, and/or other information. By way of non-limiting illustration, addresses may include one or more of a home address, a work address, a ZIP code, a city, a state, and/or other information. A legal jurisdiction may include an identification of a country, state, and/or region having jurisdiction over the individual. A location characteristic of a business entity may include one or more address(es), legal jurisdiction, and/or other information. By way of non-limiting illustration, addresses may include one or more address of principal place of business, address of one or more hubs or centers, address of corporate officer(s), and/or other information. A legal jurisdiction may include an identification of a country, state, and/or region having jurisdiction over the business entity.

A value of a contact attribute may define contact information for a user. Contact information may include one or more of a name of a business agent (for business entities), a telephone number, an email, a social media handle, and/or other information.

The user attributes characterizing authentication requests associated with the users may include one or more of a requestor attribute, a document attribute, a status attribute, a timing attribute, and/or other attributes.

A value of a requestor attribute may include information identifying individual compliance organizations who have submitted request(s) associated with individual users. Compliance organizations may be identified by name, username, and/or other identifying information.

A value of a document attribute may include information identifying and/or describing content items provided by a user, content items that have been authenticated, and/or other content. Individual content items may be identified by one or more of a document name, content item type, unique IDs, and/or other information. Authenticated content items associated with individual users may refer to documents and/or other content that a user has provided in order to verify their identify and/or otherwise comply with one or more requirements of a risk assessment by a compliance organization. By way of non-limiting illustration, content items may include documents such documents proving residence, ownership of assets, employment, and/or other documents. Users may supply (e.g., upload, scan, etc.) content items for storage. The content items may thereafter be authenticated for accuracy and completeness so that they may become classified as authenticated content items. Authentication may be performed by the system 100 and/or sent to a third-party authentication system (see, e.g., authentication component 112).

A value of a status attribute may describe status of individual requests and/or status of individual authenticated content items. Status of individual requests may characterize current state of the individual requests. State of individual requests may be characterized by one or more of timing information (e.g., when request was received, when information from a user profile was accessed, when a requested ends, and/or other information), completion information (e.g., is the request pending, canceled, expired, incomplete, partially complete, or complete), and/or other information. Status of individual authenticated content items may characterize current state of the individual authenticated content items. State of individual authenticated content items may be characterized by one or more of timing information (e.g., when a content item was uploaded, when a content item was accessed by a user or compliance organization, when a content item was updated or changed, when a content item will expire, when a content item was removed, and/or other information), review status (e.g., was the content item reviewed, is the content item under review, is the content item slated to be removed, was a request to update or change the content item made, and/or other information), and/or other information. In some implementations, expiration may be defined with respect to stated expirations on the documents themselves, and/or based on a specified passage of time. By way of non-limiting illustration, a driver's license may expire on an expiration date specified on the license; while a document proving a home address (e.g., utilities invoice) may expire after a specified period of time (e.g., the document is considered appropriate for address verification for up to one year).

By way of non-limiting illustration, the user profiles may include a first user profile for a first user and/or other user profiles. The first user profile may include one or more of first user verification information, a first authenticated content item associated with the first user, and/or other information and/or content items. The first user verification information may characterize one or more of the first user, the first authenticated content item, and/or other information. The first user verification information may include one or more of a first attribute value of a first user attribute, a second attribute value of a second user attribute, and/or other information. The first user verification information may include information input by the first user into a user interface (e.g., by responding to a prompted series of questions), information derived from the first authenticated content item (e.g., passport, driver's license, etc.) and/or other documentation (e.g., proof of ownership of one or more assets), and/or other information.

The individual compliance organization profiles may include one or more of organization information describing individual compliance organizations, request information, request profile(s), risk profile(s), and/or other information.

The organization information describing individual compliance organizations may define values of organization attributes and/or other information. The organization attributes describing characteristics of the compliance organizations may include one or more of a name attribute, a location attribute, a contact attribute, and/or other attributes. The one or more of the name attribute, location attribute, contact attribute, and/or other attributes making up the organization attributes may characterize the same or similar information as they do for users who are business entities.

The request information may include values of request attributes describing characteristics of requests submitted by the compliance organizations. The request attributes describing characteristics of requests may include one or more of a subject attribute, a status attribute, a timing attribute, and/or other attributes.

A value of a subject attribute may include information identifying users who are subjects of requests submitted by compliance organizations. Users may be identified by name, username, nickname, full business name (for business entities), and/or other identifying information.

A value of a status attribute may describe status of individual requests submitted by compliance organizations and/or status of individual authenticated content items associated with the individual requests. Status of individual requests may characterize current state of the individual requests from the perspective of the compliance organizations. State of individual requests may be characterized by one or more of timing information (e.g., when a request was generated, when a request was submitted, when and what information from a user profile was retrieved as part of a request, when a request ends or expires, and/or other information), completion information (e.g., is the request pending, canceled, expired, incomplete, partially complete, under review, and/or complete), and/or other information. Status of individual authenticated content items may characterize current state of the individual authenticated content items requested as part of a request. State of individual authenticated content items may be characterized by one or more of timing information (e.g., when a content item was uploaded by a user, when a content item was accessed by a user or compliance organization, when a content item was updated or changed, when a content item will expire, when a content item was removed, and/or other information), review status (e.g., was the content item reviewed, is the content item under review, is the content item slated to be reviewed, was a request to update or change the content item made, and/or other information), authentication status (e.g., is the content item indicated as authenticated, is the content item under review for authentication, and/or other information), and/or other information.

An individual request profile may include an individual set of request criteria and/or other information. Individual compliance organizations may be associated with multiple request profiles that each include a customized set of request criteria. Compliance organizations may associate a given request profile with a given type of potential customer (e.g., entity type), such that they may select and deploy a given request profile on an as-needed basis without having to redefine the request criteria for subsequent requests. The request criteria may specify one or more of content item types, user attributes, and/or other information that may be required as part of assessment by compliance organizations.

Content item types may be characterized by document type, document name, and/or other information. Document types may include address verification type, employment verification type, asset ownership type, entity verification type, and/or other types. In some implementations, a request criterion may specify that values of a given user attribute may be required.

Address verification type documents may include documents that show or prove stated residence or address of users. By way of non-limiting illustration, address verification type documents may include one or more of lease agreements, utility bills, and/or other documents.

Employment verification type documents may include documents that show or prove stated employment status and/or income of users. By way of non-limiting illustration, employment verification type documents may include one or more of tax returns, W-2 forms, 1090 forms, and/or other documents.

Asset ownership type documents may include documents that show or prove stated asset ownerships of users. By way of non-limiting illustration, asset ownership type documents may include one or more of deeds, trusts, wills, pink slips, purchase agreements, and/or other documents.

Entity verification type documents may include documents that show or prove stated asset business formations of users who are business entities. By way of non-limiting illustration, entity verification type documents may include one or more of certificates of formation, IRS form K-1, and/or other business records.

In some implementations, content item types may be characterized by specific document names (e.g., a specific deed, IRS form, and/or other specified documents).

An individual risk profile may include an individual set of risk assessment criteria and/or other information. Individual compliance organizations may be associated with multiple risk profiles that each include a customized set of risk assessment criteria. Compliance organizations may associate a given risk profile with a given type of potential customer (e.g., entity type), such that they may select and deploy a given risk profile on an as-needed basis without having to redefine risk assessment criteria for subsequent risk assessments.

Risk assessment criteria may be expressed as one or more of valuation information, weighting information, and/or other information. The valuation information may include risk parameter values for one or more risk parameters assigned to user profiles as a function of attribute values for user attributes within the user profiles. In some implementations, individual risk parameters may correspond to individual user attributes whose values may be a source of risk. By way of non-limiting illustration, a user's length of residency may be an indicator of risk such that a risk parameter may correspond to a location attribute. Such a risk parameter may be referred to as a length-of-residency risk parameter. Other risk parameters corresponding to other user attributes may be similarly named. By way of non-limiting illustration, the amount and/or character of assets owned by a user may be an indicator of risk such that a risk parameter may correspond to a document attribute associated with a document showing ownership of asset(s). Such a risk parameter may be referred to as an asset-ownership risk parameter. By way of non-limiting illustration, an entity type of a user may be an indicator of risk such that a risk parameter may correspond to an entity type attribute. Such a risk parameter may be referred to as an entity-type risk parameter.

In some implementations, individual risk parameters may correspond to individual questions prompted for the users to answer. In some implementations, individual risk parameters may correspond to individual content items. In some implementations, a risk parameter value of a risk parameter corresponding to a content item may be assigned as a function of presence or absence of the content item in a user profile. By way of non-limiting illustration, a given risk parameter value may be assigned to a user profile based on the user profile not having a specified content item; while another given risk parameter value may be assigned to the user profile based on the user profile having the specified content item.

The weighting information may include different weights associated with individual risk parameters. In performing risk assessment (see, e.g., assessment component 115), information collected from user profiles and/or other sources may be assigned risk parameter values, weighted, and/or aggregated to produce aggregate risk parameter values.

Risk parameter values may be assigned to certain user information (e.g., values of given user attributes) and/or content item types, applied to the content of the user profiles that satisfy requests, weighted based on custom-defined weights, and/or aggregated to provide aggregate risk parameter values. The risk parameter values may include numerical values that make up a sliding scale of risk (e.g., a value being an integer between zero and five, with zero being very low risk of criminal activity and five being very high risk). In some implementations, weights may be defined by decimal values between zero and one (or percentages between zero and 100), with zero being no weight is given and one (or 100%) being full weight is given. An aggregate risk parameter value for a user profile may convey overall risk of doing business with a given user. Aggregating may include one or more of summing the weighted risk parameter values, averaging the weighted risk parameter values, and/or other operations.

Individual risk parameter values for a risk parameter may be assigned to a user profile as a function of attribute value(s) for a corresponding user attribute within the user profile. A risk profile may specify that a given risk parameter value is assigned for a risk parameter when an attribute value of a given user attribute comprises a specified value and/or falls within a specified range of values. The risk profile may further specify that another given risk parameter value is assigned for the risk parameter when an attribute value of a given user attribute comprises another specified value and/or falls within another specified range of values. By way of non-limiting illustration, continuing the residency length example, a risk profile may dictate that a user profile showing user residency in a given location between zero and three years may be assigned a first risk parameter value, while the user profile showing user residency in a given location between three and five years may be assigned a second risk parameter value.

In some implementations, risk assessment criteria may be defined and/or implemented through one or more logic-based decisions. Logic may include, for example, Boolean logic. By way of non-limiting illustration, logic operators such as "AND", "OR", "NOT", "IF-THEN," "THAN-IF-THEN," "IF-AND-IF-THEN", "IF-THEN-THEN," and/or other operations may be utilized to generate and/or implement risk assessment criteria. In some implementations, the use of logic operators may allow for more complex ways to assign risk parameter values to user profiles.

It noted that the above descriptions of user profiles and compliance organization profiles are for illustrative purposes only and are not to be considered limiting. Instead, it is to be understood that the profiles may include other information and/or may define users and compliance organizations in other ways. For example, a compliance organization has the ability to custom-define risk assessment criteria, and compile sets of criteria into risk profiles through the system 100, which may allow the compliance organization to assess risk in any way they deem fit as needed to comply with the particular regulations they may be subject to. Thus, while one or more descriptions herein may provide discrete examples of risk assessment criteria (e.g., valuation information and/or weighting information), this is for illustrative purposes only and not to be considered limiting. Instead, those skilled in the art may appreciate that this criteria may include other criteria depending on the particular needs of a compliance organization, their industry, and the ever-changing landscape of government regulations.

In FIG. 1, machine-readable instructions 106 of one or more processors 130 of server(s) 102 may include one or more instruction components. The instruction components may include computer program components. Executing the machine-readable instructions 106 may cause server(s) 102 to facilitate synchronized sharing of centralized authentication information to facilitate entity verification and/or risk assessment. The instruction components may include one or more of a profile component 108, a user interface component 110, an authentication component 112, a request component 114, an assessment component 115, and/or other instruction components.

The profile component 108 may be configured to obtain, manage, and/or access profile(s) 129 stored by electronic storage 128. Managing profile(s) 129 may include one or more of generating profiles, changing profiles, updating existing information within profiles, and/or other features and/or functionality.

The electronic storage 128 may include a secure database that stores and encrypts content making up profiles. As information is provided to system 100, it may be encrypted and stored in association with public and private keys. Private keys may be stored in user profiles and made available to users of the user profiles when accessing user profiles (e.g., after a user logs in). Thus, the system 100 itself may not have access to the substantive content of the user profiles, other than the encrypted version of the data. Generating and presenting user interfaces to display content of user profiles and/or other information stored in electronic storage 128 may be based on being granted access to the database. Relationships between user profiles and organization profiles may be established and authorized. For example, a request submitted by compliance organization with respect to a user may have to be accepted and/or otherwise indicated as authorized by the user before information is shared from a user profile. The private keys held in user profiles may then be passed to organization profiles so that content of user profiles satisfying requests can be accessed and displayed at computing platforms of the compliance organizations. Other encryption methods are contemplated.

User interface component 110 may be configured to effectuate presentation of individual user interfaces on individual client computing platforms of one or more client computing platforms 104. User interface component 110 may be configured to establish one or more network connections between the server(s) 102 and individual client computing platforms. User interface component 110 may be configured to effectuate communication of user interface information to the individual client computing platforms over the one or more network connections to cause the individual client computing platforms to present one or more user interfaces.

In some implementations, a user interface through which users and/or compliance organizations access and/or otherwise interact with the system 100 may include one or more user interface pages (sometimes referred to simply as "pages"). Pages may be expressed as individual portions of a user interface, windows of a user interface, and/or other user interfaces altogether. Users may navigate between pages through one or more of a navigation button, selection of tabs, and/or other user input. The user interface information may further define individual pages of the user interface. An individual page may be dedicated to, and/or otherwise associated with, presenting particular sets of information.

In some implementations, an individual page may include a grid display, and/or other display arrangements. A grid may include one or more of a set of attribute-named columns, a set of rows, individual cells at intersections of individual attribute-named columns and individual rows, and/or other content. An individual attribute-named column may represent an individual attribute. An individual row may represent an individual content item or request. The individual cells may include individual values of the individual attributes represented in the attribute-named columns.

User interface component 110 may be configured to generate user interface information defining one or more user interfaces through which users and/or compliance organizations interact with the system 100 and/or each other.

A given user interface may be configured to facilitate one or more of defining and/or updating profiles, submitting and/or displaying requests, and/or other features and/or functionality described herein. An instance of a user interface may include one or more user interface portions. By way of non-limiting illustration, a user interface may include one or more of an input portion, a display portion, and/or other portions. Individual portions may include one or more user interface elements configured to facilitate user interaction with the user interface. By way of non-limiting illustration, user interface elements may include one or more of text input fields, drop-down menus, check boxes, display windows, virtual buttons, file drag-and-drop elements, file upload buttons, and/or other elements configured to facilitate user interaction.

An input portion of a user interface may be configured to obtain user input. User input may include one or more of input to generate a profile, input to modify a profile, input to update a profile, input to navigate between pages, and/or other input. The user input may include one or more of entering text, selecting user interface elements, uploading digital content items (e.g., electronic files), and/or other user input. A display portion may be configured to display information.

In some implementations, users may be provided a user interface through which the users manage the user profiles. Managing may include one or more of creating, editing (e.g., adding information and/or documents, modifying information and/or documents), and/or other actions that may impact the content of user profiles. By way of non-limiting illustration, the user interface may be configured to receive user entry and/or selection of user information, uploads of instances of content items to be authenticated, uploads of authenticated content items, and/or other user input.

User interface component 110 may be configured to effectuate communication of user interface information to computing platforms associated with the users to cause the computing platforms associated with the users to present the user interface through which the users access system 100.

In some implementations, pages accessed by users of the system 100 may include one or more of profile pages through which the users access user profiles, request status pages displaying status of the requests, document status pages displaying status of individual authenticated content items, and/or other pages.

Figures 3, 4:
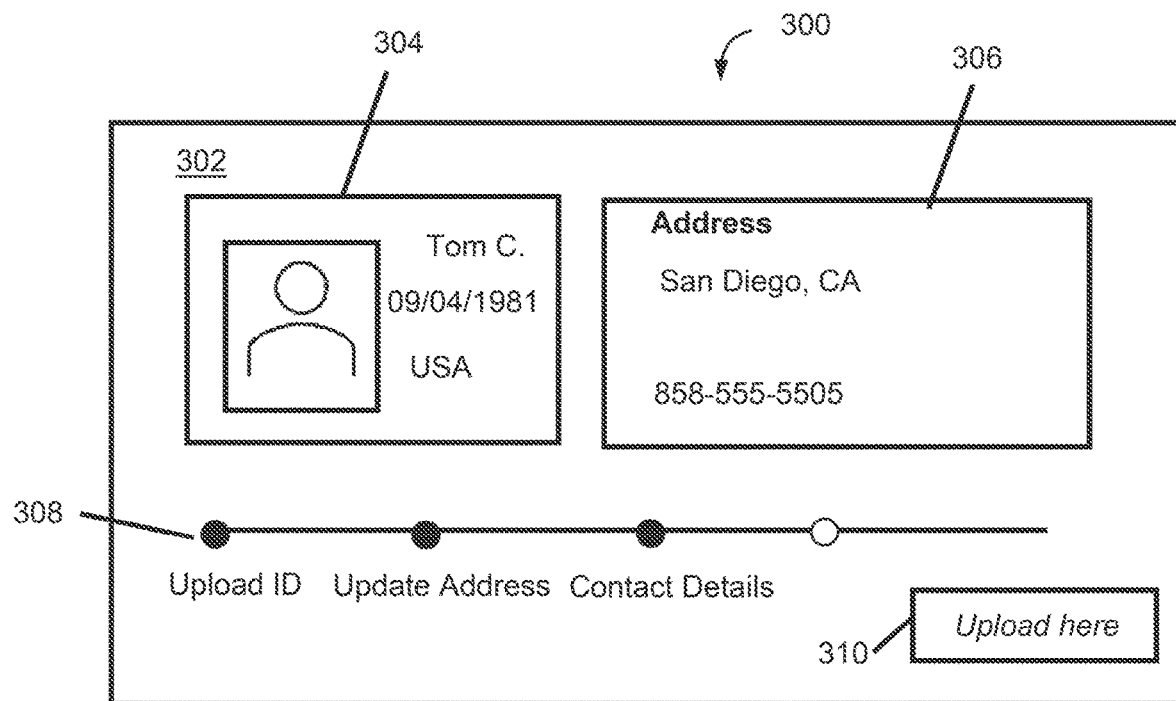
FIG. 3 illustrates a user interface comprising a profile page through which a user manages a user profile, in accordance with one or more implementations.
FIG. 4 illustrates a user interface comprising a document status page through which a user views status of content item(s) shared as part of request(s), in accordance with one or more implementations.

Profile pages may provide users with access to view, edit, update, and/or otherwise interact with content of their user profiles (see, e.g., FIG. 3). In some implementations, a profile page (and/or other pages) may be configured to present a series of questions and include one or more user interface elements though which the users provide responses to individual questions. In some implementations, individual questions may be related to individual user attributes such that one or more attribute values for one or more of the user attributes may be determined based on user-provided responses to one or more questions. A page may include a set of check boxes, a text input field, and/or other user interface element through which users may input or select answers.

Figure 5:
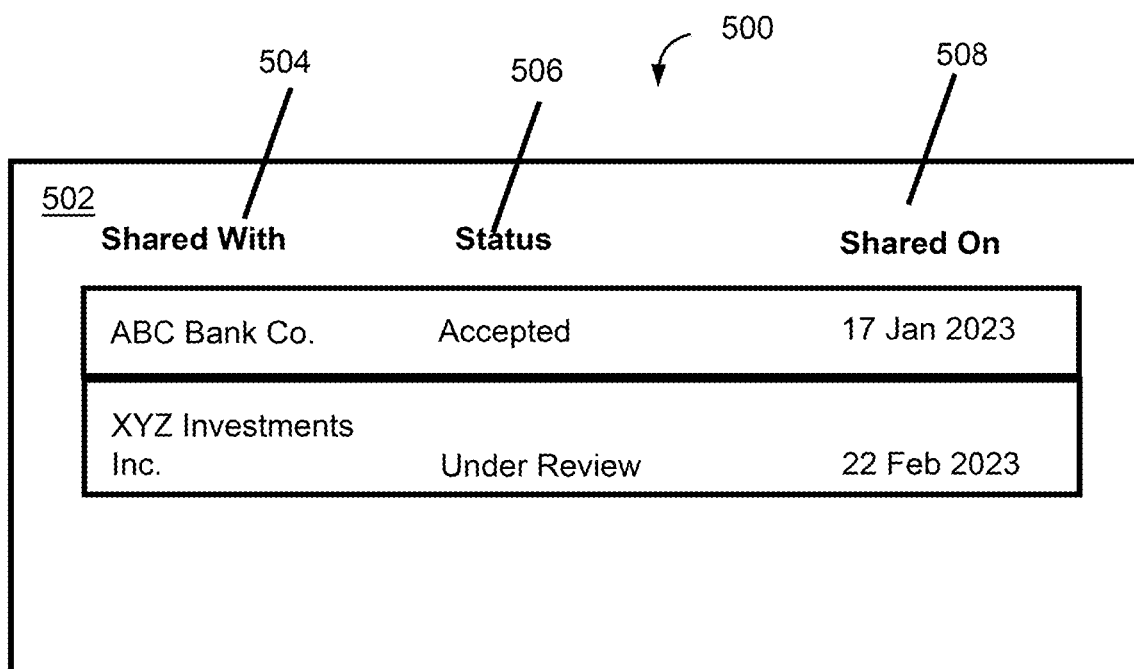
FIG. 5 illustrates a user interface comprising a request status page through which a user views status of request(s), in accordance with one or more implementations.

Request status pages may display status of one or more requests from the perspective of users (see, e.g., FIG. 5). In some implementations, an individual request status page may display status of an individual request. In some implementations, an individual request status page may display status of one or more requests. By way of non-limiting illustration, a request status page may display one or more values of a status attribute describing status of individual requests.

The document status pages may display status of one or more content items and/or authenticated content items (see, e.g., FIG. 4). In some implementations, an individual document status page may display status of a content item as being authenticated, under review for authentication, and/or denied authentication. In some implementations, an individual document status page may display status of an individual authenticated content item. In some implementations, an individual documentation status page may display status of one or more authenticated content items. In some implementations, an individual documentation status page may display status of one or more authenticated content items associated with one or more requests. By way of non-limiting illustration, a document status page may display one or more values of a status attribute describing status of individual authenticated content items.

In some implementations, user interface component 110 may be configured to generate user interface information defining a user interface through which users provide responses to a prompted series of questions. Individual questions may be related to generating information for user profiles and/or otherwise providing a supplemental mechanism to obtain information about users that may or may not be derived from user-provided information or content items within the user profiles. Responses to the questions may become part of the user profiles and/or may become part of particular requests as information that satisfies the individual requests. By way of non-limiting illustration, a question may include "How long have you been at your current residence?" By way of non-limiting illustration, a question may include "Do you own a home?" By way of non-limiting illustration, a question may include "How long have you owned your home?"

The user interface component 110 may be configured to effectuate communication of the user interface information to computing platforms associated with users to cause the computing platforms to present instances of the user interface displaying the prompted series of questions and one or more user interface elements through which users may provide responses.

The user interface component 110 may be configured to obtain response information conveying one or more responses to one or more questions by individual users. The profile component 108 may be configured to generate one or more attribute values for one or more user attributes of individual user profiles based on responses conveyed in response information.

In some implementations, compliance organizations may be provided a user interface including a page configured to obtain user entry and/or selection of requests to verify users and/or assess risk of users. The entry and/or selection of a request may include one or more of entry and/or selection of a user or user profile, request profile(s), risk profile(s), and/or other information. Individual ones of the requests may identify individual ones of the user profiles and may include one or more of request criteria of a request profile, risk assessment criteria of a risk profile, and/or other information.

In some implementations, a user interface provided to compliance organizations may be configured to receive entry and/or selection of request criteria through a set of user interface elements of the user interface. The set of user interface elements may correspond to potential content item types that are available to be included in the requests, individual user attributes, individual questions, and/or other information. The entry and/or selection of a user interface element in the set of user interface elements may cause a corresponding potential content item type to be included as a content item type required by a request. The entry and/or selection of a user interface element in the set of user interface elements may cause a corresponding user attribute to be included as required by a request. In some implementations, one or more user interface elements may allow compliance organizations to custom-define request criteria including, but not limited to, custom-defined content item types and/or user attributes.

In some implementations, upon entry and/or selection of request criteria, the compliance organizations may be provided an option to save the request criteria into a request profile. In some implementations, entry and/or selection of request criteria may be accomplished through selection of a previously defined request profile.

In some implementations, a user interface provided to compliance organizations may be configured to receive entry and/or selection to submit a request. By way of non-limiting illustration, the user interface may include a virtual button labeled "submit" that causes a request to be executed.

It is noted that while submission of requests is described with respect to entry and/or selection within a user interface of the system 100, this is for illustrative purposes only and not to be considered limiting. Instead, in some implementations, requests may be generated and/or submitted through input into an external resource 126. Compliance organizations and/or users may link external accounts, such as email, social media, message applications, and/or other external accounts. External accounts may be part of external resource(s) 126 in FIG. 1. One or more external accounts may be communicate with the server(s) 102. User input into an external account may cause a request to be generated and/or submitted by the system 100. By way of non-limiting illustration, a compliance organization may link an external email account where sending of emails to certain recipients and/or including certain key words may provide the basis for submitting requests.

In some implementations, user interface component 110 may be configured to generate user interface information defining a user interface through which compliance organizations select and/or define individual questions to be prompted to users. The selection and/or definition of questions by compliance organizations may be used as the basis for generating the user interface information for the user interface through which users are presented a series of questions.

The user interface component 110 may be configured to effectuate communication of the user interface information to computing platforms associated with compliance organizations to cause the computing platforms to present instances of the user interface through which compliance organizations select and/or define the questions.

In some implementations, compliance organizations may be provided a user interface that may be configured to obtain user entry and/or selection of risk assessment criteria and/or information making up risk profiles. A user interface provided to compliance organizations may include a page configured to receive entry and/or selection of one or more of valuation information, weighting information, and/or other information of the individual risk profiles through a set of user interface elements of the user interface. The set of user interface elements may be configured to receive user input to perform one or more of identify user attributes and/or content item types, specify risk parameter values assigned as a function of the attribute values and/or content items present (or absent) in a user profile, specify risk parameter values assigned as a function of responses to questions, specify individual weights applied individual risk parameter values, specify aggregation type (e.g., summation, averaging, etc.), and/or specify other information making up risk profiles.

The user interface component 110 may be configured to generate user interface information defining a user interface through which content of user profiles is provided to compliance organizations in response to submission of request. The user interface may be configured to display one or more of user verification information, instances of authenticated content items, and/or other information in the user profiles. In some implementations, the user interface through which content of the user profiles is accessed by compliance organizations may be limited to content within the user profiles that satisfy the request criteria of the requests submitted by the compliance organizations. Accordingly, the compliance organizations may be limited to only viewing and/or accessing a record of the documentation and/or information they requested, while other information in the user profiles not requested is maintained securely in storage. In some implementations, the user interface may display outcome of automated risk assessment (e.g., weighted risk parameter values and/or aggregate risk parameter values) concurrently with content of the user profiles that satisfy request criteria. By way of non-limiting illustration, the user interface information may define a user interface through which content of user profiles is accessed and the aggregate risk parameter values are displayed.

The user interface component 110 may be configured to provide functionality of automated translation of documents to a specified language. By way of non-limiting illustration, the system 100 may include and/or may have access to machine translation functionality that may be performed on user-provided information and/or characters that are recognized from uploaded documents (e.g., performing OCR and machine translation). In some implementations, a machine translation service may be provided through an external resource.

In some implementations, a user interface through which content of the user profiles and/or aggregate risk parameter values are displayed may include one or more pages. The user interface information may further define individual pages of the user interface. An individual page may be dedicated to, and/or otherwise associated with, presenting particular sets of information regarding a request. By way of non-limiting illustration, pages may include one or more of a request profile page, a request status page, a risk assessment page, and/or other pages.

Figure 6:
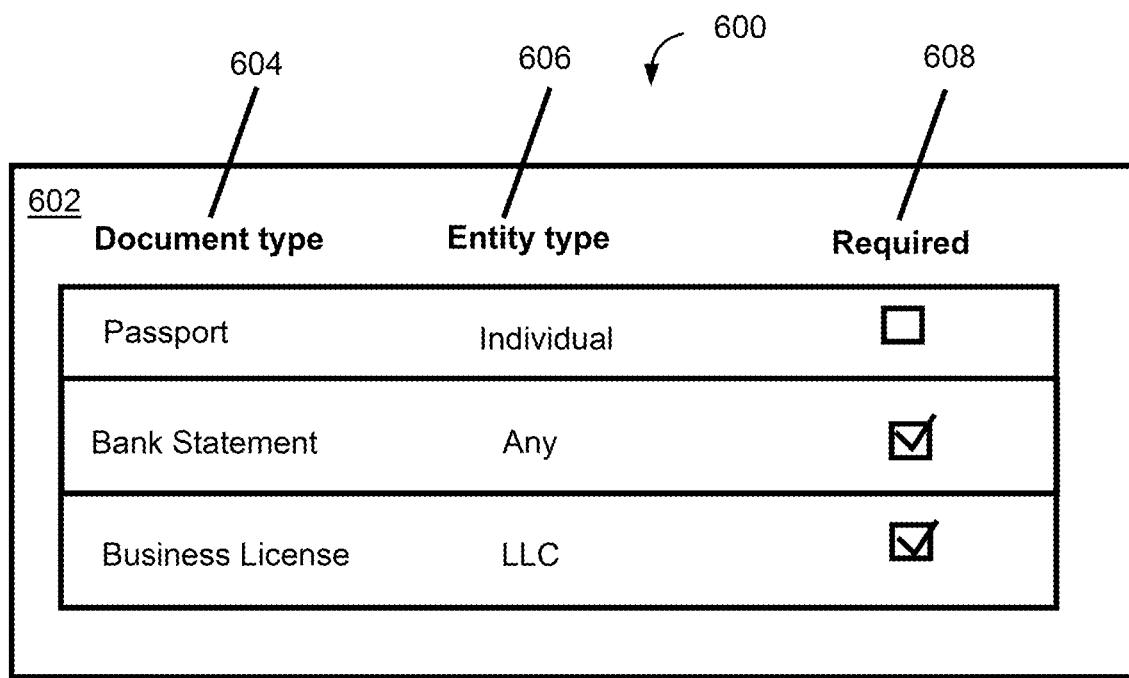
FIG. 6 illustrates a user interface comprising a request profile page through which a compliance organization specifies request criteria of a request, in accordance with one or more implementations.

Request profile pages may provide compliance organizations with access to view, edit, create, update, and/or otherwise interact with request profiles (see, e.g., FIG. 6). The request profile pages may be configured to receive entry and/or selection of request criteria through a set of user interface elements of the user interface. Individual user interface elements may correspond to user attributes and/or potential content item types to be included as a content item type required by a request. Potential content item types may be categorized by entity type. User interface elements (e.g., check boxes) may be selected to specify content item type and/or user attributes that may be required as part of requests.

Figures 7, 8:
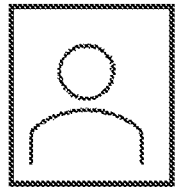
FIG. 7 illustrates a user interface comprising a request status page through which a compliance organization views status of request(s), in accordance one or more implementations.
FIG. 8 illustrates a user interface comprising a page showing results of automated risk assessment of a user profile, in accordance with one or more implementations.

Request status pages of a user interface provided to compliance organizations may display status of one or more requests from the perspective of the compliance organizations (see, e.g., FIG. 7). In some implementations, an individual request status page may display status of an individual request. In some implementations, an individual request status page may display status of one or more requests. By way of non-limiting illustration, a request status page may display one or more values of a status attribute of an organization profile describing status of individual requests. By way of non-limiting illustration, a request status page may indicate if a request is one or more of active, expired, pending, and/or other has other statuses.

Figure 11:
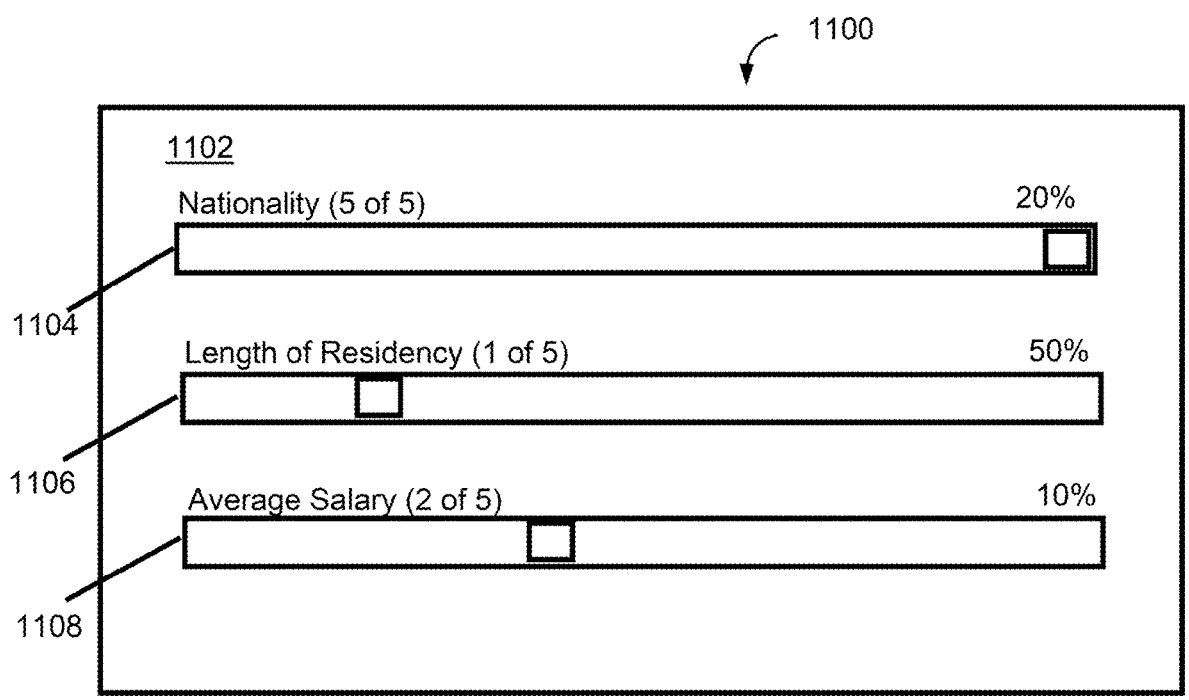
FIG. 11 illustrates a user interface comprising a page showing results of automated risk assessment of a user profile including a set of risk parameter values and weights, in accordance with one or more implementations.

Risk assessment pages may comprise pages where compliance organizations define risk profiles, and/or view the results of automated risk assessments of users based on the risk assessment criteria (see, e.g., FIG. 8 and/or FIG. 11). Defining risk profiles may include defining one or more of valuation information, weighting information, questions to be promoted to users, and/or other information.

The user interface component 110 may be configured to generate visual content items representing weighted risk parameter values, aggregate risk parameter values, and/or other information. Individual visual content items may be displayed as part of individual instances of user interfaces and/or pages that provide compliance organizations with access to content of user profiles that satisfy request criteria. In some implementations, individual visual content items may be representative of individual values through one or more of color-coding, text-based indicia, graphical indicators, and/or other content. By way of non-limiting illustration, a risk assessment page may include a graphical risk indicator which displays an aggregated risk parameter value (see, e.g., assessment component 115). By way of non-limiting illustration, a graphical risk indicator may comprise a sliding scale graphic indicator and/or other content. A sliding scale graphic indicator may include one or more of a visual scale element, a visual slider element, and/or other content. A position of the visual slider element relative the visual scale element may be representative of an individual aggregate risk parameter value.

The authentication component 112 may be configured to authenticate content items provided by users. Authentication by authentication component 112 may include processing of content items such as one or more of Optical Character Recognition (OCR), comparing content items against reference content items (e.g., comparing a drivers license photo to an image of a user uploaded by the user, comparing address listed on drivers license to address listed on utility bill, etc.), digital data forensics (e.g., document tamper detection, falsification detection, identifying official insignia or indicia, identifying signatures, etc.), and/or other processors. Those skilled in the art may recognize that document authentication is a technology in and of itself that may be included as part of the system 100 and/or provided through one or more external resources 126. Thus, while not described at length herein, those skilled in the art may appreciate the technical steps and/or procedures that may be required to authenticate user-provided documentation in accordance with one or more features and/or functionality presented herein.

The user interface component 110 may be configured to obtain user input information and/or other information. The user input information may convey user input into the instances of a user interface by the compliance organizations. The user input may include definitions of one or more of the valuation information, the weighting information, and/or other information making up the individual risk profiles. By way of non-limiting illustration, the user input information may convey first user input into the instance of the user interface by the first compliance organization. The first user input may include definition of one or more of first valuation information, first weighting information, and/or other information making up a first risk profile. The first valuation information may include a first risk parameter value for a first risk parameter that is assigned as a function of the first user attribute having the first attribute value and/or other values. The first valuation information may include a second risk parameter value for a second risk parameter that is assigned as a function of the second user attribute having the second attribute value and/or other values. The first weighting information may include one or more of a first weight associated with the first risk parameter, a second weight associated with the second risk parameter, and/or other weights.

The request component 114 may be configured to obtain and/or generate individual requests based on user input by the compliance organizations into one or more user interfaces. The request component 114 may be configured to obtain and/or generate individual requests based on user input by the compliance organizations into one or more external resources 126. By way of non-limiting illustration, the requests may include one or more of a first request by a first compliance organization and/or other requests. The first request may include one or more of identification of the first user profile, a first set of request criteria, identification of the first risk profile, and/or other information. The first set of request criteria may indicate that attribute values for the first user attribute, the second user attribute, and/or other user attributes are required as part of the first request.

The request component 114 may be configured to, in response to obtaining individual requests, identify the user profiles associated with the requests, and/or perform other operations. The request component 114 may be configured to, in response to identifying the user profiles, identify content within the user profiles that satisfies the request criteria of the individual ones of the requests, and/or perform other operations. The request component 114 may be configured to, in response to obtaining individual requests, identify the user profiles associated with the requests and identify content within the user profiles that satisfies the request criteria of the individual ones of the requests. In some implementations, satisfaction of requests may be determined based on content of the user profiles being of the content item type(s) specified in the request criteria and/or the user profiles having attribute values of user attributes specified in the request criteria. In some implementations, request component 114 may be configured to generate and deliver onboarding invites to computing platforms of consumers who have yet to create user profiles within the system 100. The invites may be sent via external messaging, such as email, which may include instructions on creating a user profile within the system 100.

In some implementations, request component 114 may be configured to generate and deliver user requests to computing platforms associated with the users in response to the request criteria of the individual ones of the requests not being satisfied by the content within the user profiles. The user requests may comprise notifications or alerts communicated to computing platforms of the users for presentation within a user interface of the system and/or an external resource (e.g., email). The user requests may notify the users of the content item types that are missing from the user profiles but are required as part of the requests and/or may include other information.

The request component 114 may be configured to manage requests by monitoring and/or determining status and/or status changes of the requests and/or authenticated content items. The status of the requests may be made current in user and compliance organization profiles. The request component 114 may be configured to determine expired status by querying dates, e.g., stated expiration dates, and then determining amount of time that has surpassed since an initial date (e.g., date of request, date of upload, and/or other dates). By way of non-limiting illustration, request component 114 may be configured to determine whether a status of a document is an expired status by querying any stated expiration on a document itself. By way of non-limiting illustration, request component 114 may be configured to determine a status of a request is expired by determining whether a specified amount of time has passed without a user providing requisite information.

The assessment component 115 may be configured to perform automated risk assessments. In some implementations, the automated risk assessments may be based on risk assessment criteria (e.g., valuation information, weighting information, and/or other information) defined by compliance organizations, such as risk assessment criteria making up one or more risk profiles created by the compliance organizations. The risk assessment criteria may be compared against the content of the user profiles that satisfy the request criteria. The outcome of aggregating a set of risk parameter values may be the aggregate risk parameter value which itself may include a numerical value within a range of values making up a sliding scale of overall risk.

By way of non-limiting illustration, the assessment component 115 may be configured to generate sets of weighted risk parameter values for the user profiles. The sets of weighted risk parameter values may be generated in response to obtaining the requests and/or in response to other events (e.g., identifying information that satisfies request criteria). The sets of weighted risk parameter values may be generated based on one or more of the risk profiles, the information from the user profiles that satisfy the request criteria of the requests, and/or other information. By way of non-limiting illustration, a first weighted risk parameter value and a second weighted risk parameter value may be generated for the first user profile. The first weighted risk parameter value may be generated based on the first risk parameter value and the first weight by virtue of the first user profile having the first attribute value for the first user attribute. By way of non-limiting illustration, if the first risk parameter value is a numerical value such as "4," and the weight is "0.2," the first weighted risk parameter value may be a numerical value of "0.8" (4×0.2). The second weighted risk parameter value may be generated based on the second risk parameter value and the second weight by virtue of the first user profile having the second attribute value for the second user attribute. By way of non-limiting illustration, if the second risk parameter value is a numerical value such as "3," and the weight is "1," the second weighted risk parameter value may be a numerical value of "3" (3×1).

In some implementations, assessment component 115 may be configured to generate aggregate risk parameter values for the user profiles by aggregating the weighted risk parameter values and/or performing other operations. By way of non-limiting illustration, a first aggregate risk parameter value may be generated from one or more of the first weighted risk parameter value, the second weighted risk parameter value, and/or other values. The first aggregate risk parameter value may include, for example, an average of the first weighted risk parameter value and the second weighted risk parameter value. By way of non-limiting illustration, using the above numerical examples, the first aggregate risk parameter value may be an average of 0.2 and 3, e.g., 1.6.

It is noted that the description of a sliding scale as a visual representation of a risk indicator is for illustrative purposes only and not to be considered limiting. Instead, those skilled in the art may appreciate other ways to visually represent the outcome of a risk assessment. By way of non-limiting illustration, a visual representation may include qualitative description of risk, e.g., a display of the words "high risk," "low risk," "moderate risk," "acceptable risk," and/or other descriptions may be provided.

The user interface component 110 may be configured to effectuate communication of user interface information to the computing platforms associated with the compliance organizations to cause the computing platforms to present instances of a user interface displaying one or more of information of the user profiles that satisfy the request criteria, aggregate risk parameter values, and/or other information. By way of non-limiting illustration, the user interface information may be communicated to the first computing platform associated with the first compliance organization to cause the first computing platform to present an instance of the user interface displaying one or more of information from the first user profile satisfying the first request (e.g., first attribute value, the second attribute value, and/or other information), the first aggregate risk parameter value, and/or other information.

In some implementations, the user interface component 110 may be configured to generate user interface information defining a user interface through which sets of risk parameter values (and/or weighted risk parameters) for user profiles are displayed. This may allow the compliance organizations to view risk assessments at a more granular level in addition to, and/or alternatively to, the aggregate risk parameter values.

The user interface component 110 may be configured to effectuate communication of the user interface information to the computing platforms associated with the compliance organizations to cause the computing platforms to present instances of the user interface displaying sets of risk parameter values and/or sets of weighted risk parameter values for user profiles. By way of non-limiting illustration, the user interface information may be communicated to the first computing platform associated with the first compliance organization to cause the first computing platform to present an instance of the user interface displaying one or more of the first weighted risk parameter value, the second weighted risk parameter value, and/or other weighted risk parameter values generated for the first user profile.

FIG. 3 illustrates a user interface 300 comprising a profile page 302 through which a user manages a user profile, in accordance with one or more implementations. The user interface 300 may be configured to obtain user entry and/or selection of user information and/or content items. The user interface 300 may include a set of user interface elements. Individual user interface elements may correspond to individual user information and/or content items. Individual user interface elements may include, for example, display and/or text-entry fields. By way of non-limiting illustration, a first element 304 may display identifying information input by a user and/or content of an identification document (e.g., driver's license). A second element 306 may display identifying information input by a user and/or content of an identification document (e.g., driver's license). A third element 310 may be configured to receive user input to provide (e.g., upload) one or more content items (e.g., via drag-and-drop input of electronic files). In some implementations, the profile page 302 may include a status bar 308 displaying status of user input to generate their user profile.

FIG. 4 illustrates a user interface 400 comprising a document status page 402 through which a user views status of content item(s) shared as part of request(s), in accordance with one or more implementations. The user interface 400 may include a grid comprising a set of attribute-named columns, a set of rows, individual cells at intersections of individual attribute-named columns and individual rows, and/or other content. An individual attribute-named column may represent an individual attribute. By way of non-limiting illustration, the attributes may include a document name or type attribute 404, a status attribute 406, a date attribute 408 (e.g., timing information), and/or other attributes. An individual row may represent an individual content item or request. The individual cells may include individual values of the individual attributes represented in the attribute-named columns.

FIG. 5 illustrates a user interface 500 comprising a request status page 502 through which a user views status of request(s), in accordance with one or more implementations. The user interface 500 may include a grid comprising a set of attribute-named columns, a set of rows, individual cells at intersections of individual attribute-named columns and individual rows, and/or other content. An individual attribute-named column may represent an individual attribute. By way of non-limiting illustration, the attributes may include a requestor attribute 504, a status attribute 506, a date attribute 508 (e.g., timing information), and/or other attributes. An individual row may represent an individual content item or request. The individual cells may include individual values of the individual attributes represented in the attribute-named columns.

FIG. 6 illustrates a user interface 600 comprising a request profile page 602 through which a compliance organization specifies request criteria of a request, in accordance with one or more implementations. The user interface 600 may include a grid comprising a set of attribute-named columns, a set of rows, individual cells at intersections of individual attribute-named columns and individual rows, and/or other content. An individual attribute-named column may represent an individual attribute. An individual row may represent an individual content item or request. By way of non-limiting illustration, the attributes may include a document name or type attribute 604, a demographics attribute 606 (e.g., entity type), a column to specify whether the document type is to be included as part of request criteria of a request (e.g., check boxes), and/or other attributes. The individual cells may include individual values of the individual attributes represented in the attribute-named columns.

FIG. 7 illustrates a user interface 700 comprising a request status page 702 through which a compliance organization views status of request(s), in accordance with one or more implementations. The user interface 700 may include a grid comprising a set of attribute-named columns, a set of rows, individual cells at intersections of individual attribute-named columns and individual rows, and/or other content. An individual attribute-named column may represent an individual attribute. By way of non-limiting illustration, the attributes may include a subject attribute 704, a status attribute 706, a date attribute 708 (e.g., timing information), and/or other attributes. An individual row may represent an individual content item or request. The individual cells may include individual values of the individual attributes represented in the attribute-named columns.

FIG. 8 illustrates a user interface 800 comprising a page 802 showing results of automated risk assessment of a user and providing access to content of a user profile of the user that satisfies a request, in accordance with one or more implementations. By way of non-limiting illustration, a first element 804 may display identifying information input by a user and/or content of an identification document (e.g., driver's license) that is part of the user profile. A second element 806 may display authenticated content items that satisfy criteria of a request and/or document status of the authenticated content items. A compliance organization may access the authenticated content items by, for example, clicking on a document name which may cause a corresponding authenticated content item to be presented in a window and/or downloaded. The page 802 may include a risk indicator which displays an aggregated risk parameter value. By way of non-limiting illustration, the risk indicator may comprise a sliding scale graphic indicator including a visual scale element 814 with one end being very low risk and the other end being very high risk, and a visual slider element 812 positioned in the scale element 814 to represent a determined aggregate risk parameter value.

Figure 9:
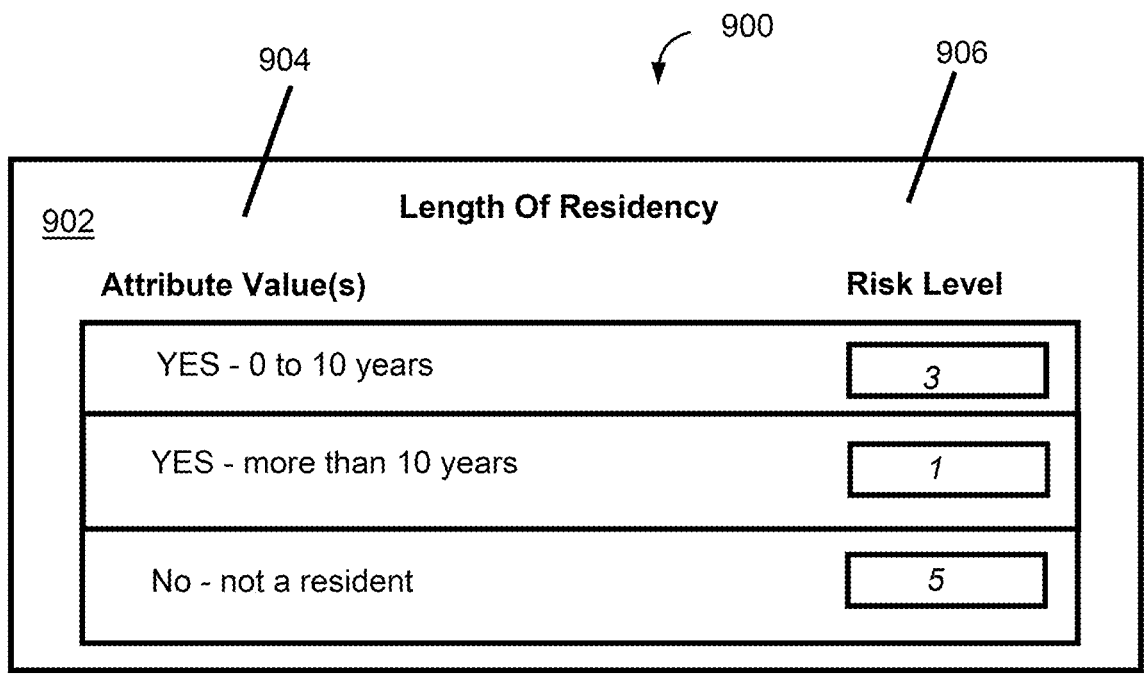
FIG. 9 illustrates a user interface comprising a page through which a compliance organization specifies risk assessment criteria including risk parameter values, in accordance with one or more implementations.

FIG. 9 illustrates a user interface 900 comprising a page 902 through which a compliance organization specifies risk assessment criteria including risk parameter values as a function of the attribute values for the user attributes within the user profiles, in accordance with one or more implementations. By way of non-limiting illustration, the user interface 900 may be specific to a given risk parameter, which corresponds to the user attribute of "length of residency." The page 902 may include a grid comprising a set of columns, a set of rows, individual cells at intersections of individual columns and individual rows, and/or other content. A first column 904 may list different attribute values and/or ranges of attribute values of an attribute (e.g., Length of residence) that lead to assignment of different risk parameter values. A second column 904 may represent the assigned risk parameter values (shown as "risk level"). The cells in the second column 904 may include user interface elements such as text input fields that receive user input to specify the risk parameter value assigned as a function of the attribute values in the first column 904.

Figure 10:
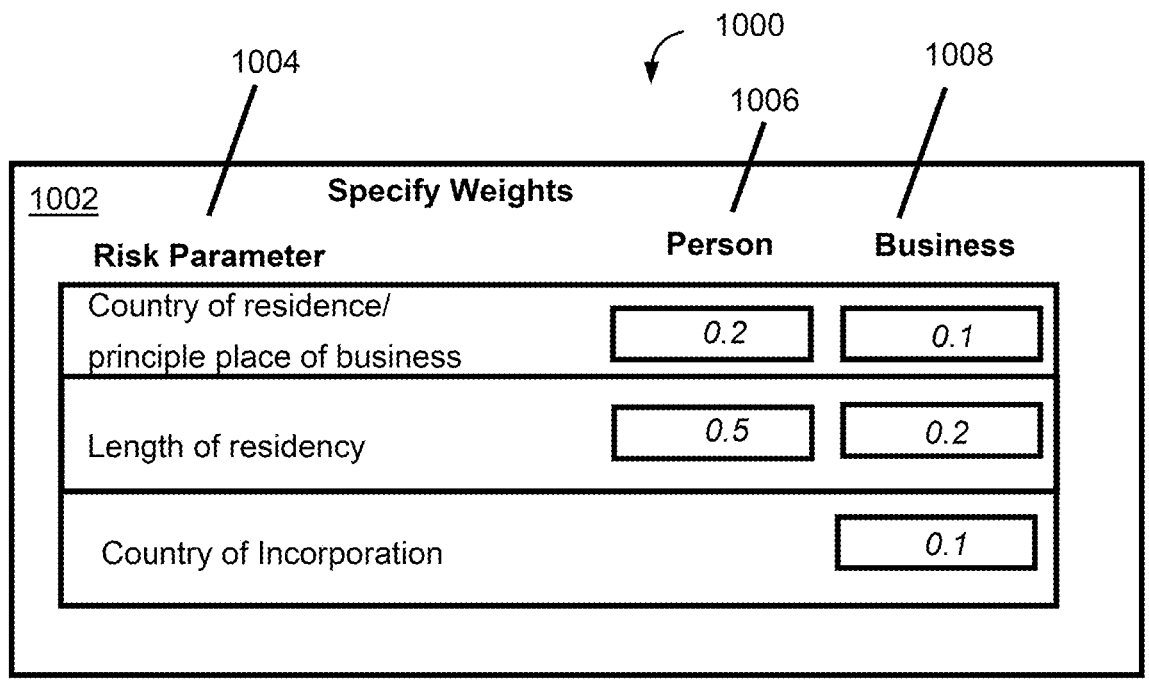
FIG. 10 illustrates a user interface comprising a page through which a compliance organization specifies risk assessment criteria including weights applied to risk parameters, in accordance with one or more implementations.

FIG. 10 illustrates a user interface 1000 comprising a page 1002 through which a compliance organization specifies risk assessment criteria including weights applied to risk parameters, in accordance with one or more implementations. The page 1002 may include a grid comprising a set of columns, a set of rows, individual cells at intersections of individual columns and individual rows, and/or other content. A first column 1004 may list different risk parameters that correspond to different user attributes. A second column 1006 and a third column 1008 may represent the weights assigned to the risk parameters (shown as "risk level"). An individual column may be associated with an individual entity type. By way of non-limiting illustration, the second column 1006 may be specific to persons; and the third column 1008 may be specific to business entities. The cells in second column 1006 and third column 1008 may include user interface elements such as text input fields that receive user input to specify the weights that apply to the risk parameters of the first column 1004.

FIG. 11 illustrates a user interface 1100 comprising a page 1102 showing results of automated risk assessment of a user profile including a set of risk parameter values and weights, in accordance with one or more implementations. By way of non-limiting illustration, the page 1102 may include one or more of a set of sliding scale graphic indicators representing individual risk parameter values for individual risk parameters, text display of the risk parameter values, text display of the individual weights, and/or other information. A first sliding scale graphic indicator 1104 may represent a first risk parameter value. The first sliding scale graphic indicator 1104 may be accompanied by a text display of the first risk parameter value (e.g., 5 of 5), a weight of the first risk parameter value (e.g., 20%), and/or other information. By way of non-limiting illustration, the first sliding scale graphic indicator 1104 may show that a nationality risk parameter for a user profile has a value of 5 out of 5 and is assigned as weight of 20% (or 0.2). A second sliding scale graphic indicator 1106 may represent a second risk parameter value. The second sliding scale graphic indicator 1106 may be accompanied by a text display of the second risk parameter value (e.g., 1 of 5), a weight of the second risk parameter value (e.g., 50%), and/or other information. By way of non-limiting illustration, the second sliding scale graphic indicator 1106 may show that a length of residency risk parameter for a user profile has a value of 1 out of 5 and is assigned as weight of 50% (or 0.5). A third sliding scale graphic indicator 1108 may represent a third risk parameter value. The third sliding scale graphic indicator 1108 may be accompanied by a text display of the third risk parameter value (e.g., 2 of 5), a weight of the third risk parameter value (e.g., 10%), and/or other information. By way of non-limiting illustration, the third sliding scale graphic indicator 1108 may show that a average salary risk parameter for a user profile has a value of 2 out of 5 and is assigned as weight of 10% (or 0.1).

Returning to FIG. 1, in some implementations, server(s) 102, client computing platform(s) 104, and/or external resources 126 may be operatively linked via one or more electronic communication links. For example, such electronic communication links may be established, at least in part, via a network 116 such as the Internet and/or other networks. It will be appreciated that this is not intended to be limiting, and that the scope of this disclosure includes implementations in which server(s) 102, client computing platform(s) 104, and/or external resources 126 may be operatively linked via some other communication media.

A given client computing platform 104 may include one or more processors configured to execute computer program components. The computer program components may be configured to enable an expert or user associated with the given client computing platform 104 to interface with system 100 and/or external resources 126, and/or provide other functionality attributed herein to client computing platform(s) 104. By way of non-limiting example, the given client computing platform 104 may include one or more of a desktop computer, a laptop computer, a handheld computer, a tablet computing platform, a NetBook, a Smartphone, a gaming console, and/or other computing platforms.

External resources 126 may include sources of information outside of system 100, external entities participating with system 100, and/or other resources. In some implementations, some or all of the functionality attributed herein to external resources 126 may be provided by resources included in system 100. By way of non-limiting illustration, an external entity may include a document authenticator, and/or other entities.

Server(s) 102 may include electronic storage 128, one or more processors 130, and/or other components. Server(s) 102 may include communication lines, or ports to enable the exchange of information with a network 116 and/or other computing platforms. Illustration of server(s) 102 in FIG. 1 is not intended to be limiting. Server(s) 102 may include a plurality of hardware, software, and/or firmware components operating together to provide the functionality attributed herein to server(s) 102. For example, server(s) 102 may be implemented by a cloud of computing platforms operating together as server(s) 102.

Electronic storage 128 may comprise non-transitory storage media that electronically stores information. The electronic storage media of electronic storage 128 may include one or both of system storage that is provided integrally (i.e., substantially non-removable) with server(s) 102 and/or removable storage that is removably connectable to server(s) 102 via, for example, a port (e.g., a USB port, a firewire port, etc.) or a drive (e.g., a disk drive, etc.). Electronic storage 128 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 128 may include one or more virtual storage resources (e.g., cloud storage, a virtual private network, and/or other virtual storage resources). Electronic storage 128 may store software algorithms, information determined by processor(s) 130, information received from server(s) 102, information received from client computing platform(s) 104, and/or other information that enables server(s) 102 to function as described herein.

Processor(s) 130 may be configured to provide information processing capabilities in server(s) 102. As such, processor(s) 130 may include one or more of a digital processor, an analog processor, a digital circuit designed to process information, an analog circuit designed to process information, a state machine, and/or other mechanisms for electronically processing information. Although processor(s) 130 is shown in FIG. 1 as a single entity, this is for illustrative purposes only. In some implementations, processor(s) 130 may include a plurality of processing units. These processing units may be physically located within the same device, or processor(s) 130 may represent processing functionality of a plurality of devices operating in coordination. Processor(s) 130 may be configured to execute components 108, 110, 112, 114, 115, and/or other components. Processor(s) 130 may be configured to execute components 108, 110, 112, 114, 115, and/or other components by software; hardware; firmware; some combination of software, hardware, and/or firmware; and/or other mechanisms for configuring processing capabilities on processor(s) 130. As used herein, the term "component" may refer to any component or set of components that perform the functionality attributed to the component. This may include one or more physical processors during execution of processor readable instructions, the processor readable instructions, circuitry, hardware, storage media, or any other components.

It should be appreciated that although components 108, 110, 112, 114, and/or 115 are illustrated in FIG. 1 as being implemented within a single processing unit, in implementations in which processor(s) 130 includes multiple processing units, one or more of components 108, 110, 112, 114, and/or 115 may be implemented remotely from the other components. The description of the functionality provided by the different components 108, 110, 112, 114, and/or 115 described below is for illustrative purposes, and is not intended to be limiting, as any of components 108, 110, 112, 114, and/or 115 may provide more or less functionality than is described. For example, one or more of components 108, 110, 112, 114, and/or 115 may be eliminated, and some or all of its functionality may be provided by other ones of components 108, 110, 112, 114, and/or 115. As another example, processor(s) 130 may be configured to execute one or more additional components that may perform some or all of the functionality attributed below to one of components 108, 110, 112, 114, and/or 115.

Figure 2:
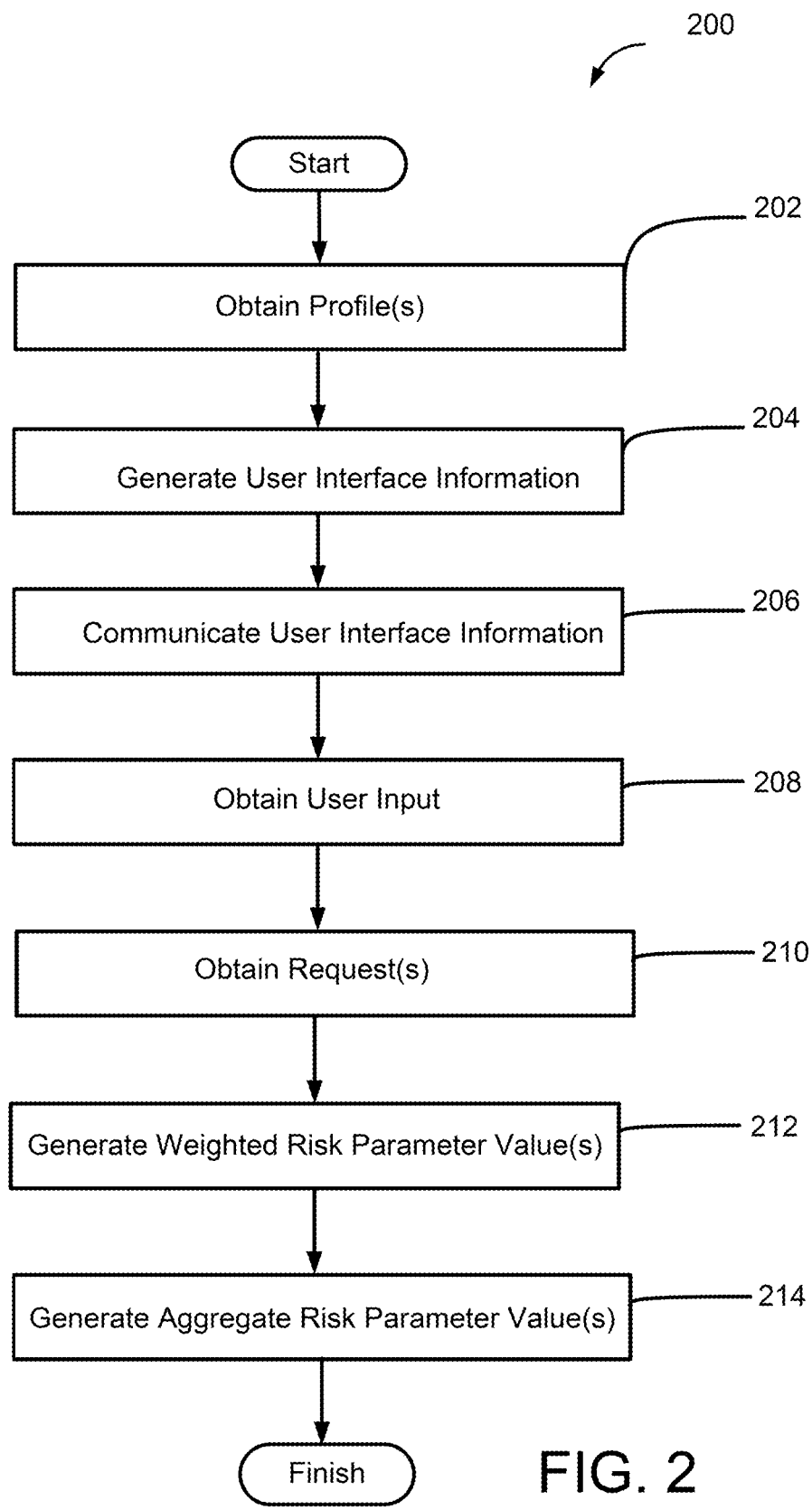
FIG. 2 illustrates a method to assess entities based on custom risk profiles defined through a user interface, in accordance with one or more implementations.

FIG. 2 illustrates a method 200 to assess entities based on custom risk profiles defined through a user interface, in accordance with one or more implementations. The operations of method 200 presented below are intended to be illustrative. In some implementations, method 200 may be accomplished with one or more additional operations not described, and/or without one or more of the operations discussed. Additionally, the order in which the operations of method 200 are illustrated in FIG. 2 and described below is not intended to be limiting.

In some implementations, method 200 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 200 in response to instructions stored electronically on an electronic storage medium. The one or more processing devices may include one or more devices configured through hardware, firmware, and/or software to be specifically designed for execution of one or more of the operations of method 200.

An operation 202 may include obtaining profiles, and/or other information. The profiles may include user profiles, organization profiles, and/or other profiles. User profiles may be associated with users. Individual user profiles may include attribute values for user attributes. The user attributes may characterize the users, authenticated content items associated with the users, and/or other aspects of the users. By way of non-limiting illustration, the user profiles may include a first user profile associated with a first user. The first user profile may include one or more of a first attribute value for a first user attribute, a second attribute value for a second user attribute, and/or other information. Operation 202 may be performed by one or more hardware processors configured by machine-readable instructions including a component that is the same as or similar to profile component 108, in accordance with one or more implementations.

An operation 204 may include generating user interface information defining a user interface through which risk profiles may be defined by compliance organizations. Individual risk profiles may include one or more of valuation information, weighting information, and/or other information. The valuation information may include risk parameter values for one or more risk parameters assigned to the user profiles as a function of attribute values for user attributes within the user profiles. The weighting information may include different weights associated with individual risk parameters. Operation 204 may be performed by one or more hardware processors configured by machine-readable instructions including a component that is the same as or similar to user interface component 110, in accordance with one or more implementations.

An operation 206 may include effectuating communication of user interface information to computing platforms associated with compliance organizations to cause the computing platforms to present instances of the user interface. By way of non-limiting illustration, the user interface information may be communicated to a first computing platform associated with a first compliance organization to cause the first computing platform to present an instance of the user interface through which the first compliance organization defines a first risk profile. Operation 206 may be performed by one or more hardware processors configured by machine-readable instructions including a component that is the same as or similar to user interface component 110, in accordance with one or more implementations.

An operation 208 may include obtaining user input information and/or other information. The user input information may convey user input into the instances of the user interface by the compliance organizations. The user input may include definitions of one or more of the valuation information, the weighting information, and/or other information making up the individual risk profiles. By way of non-limiting illustration, the user input information may convey first user input into the instance of the user interface by the first compliance organization. The first user input may include definition of one or more of first valuation information, first weighting information, and/or other information making up the first risk profile. The first valuation information may include a first risk parameter value for a first risk parameter that is assigned as a function of the first user attribute having the first attribute value and/or other values. The first valuation information may include a second risk parameter value for a second risk parameter that is assigned as a function of the second user attribute having the second attribute value and/or other values. The first weighting information may include one or more of a first weight associated with the first risk parameter, a second weight associated with the second risk parameter, and/or other weights. Operation 208 may be performed by one or more hardware processors configured by machine-readable instructions including a component that is the same as or similar to user interface component 110, in accordance with one or more implementations.

An operation 210 may include obtaining requests to verify the users. Individual requests may identify individual user profiles. Individual requests may include request criteria indicating information from the user profiles that may be required as part of the individual requests. By way of non-limiting illustration, the requests may include a first request by the first compliance organization. The first request may identify the first user profile and include a first set of request criteria. The first set of request criteria may indicate that attribute values for the first user attribute, the second user attribute, and/or other user attributes are required as part of the first request. Operation 210 may be performed by one or more hardware processors configured by machine-readable instructions including a component that is the same as or similar to request component 114, in accordance with one or more implementations.

An operation 212 may include generating sets of weighted risk parameter values for the user profiles. The sets of weighted risk parameter values may be generated automatically in response to obtaining the requests and/or in response to other events. The sets of weighted risk parameter values may be generated based on one or more of the risk profiles, the information from the user profiles that satisfy the request criteria of the requests, and/or other information. By way of non-limiting illustration, a first weighted risk parameter value and a second weighted risk parameter value may be generated for the first user profile. The first weighted risk parameter value may be generated based on the first risk parameter value and the first weight by virtue of the first user profile having the first attribute value for the first user attribute. The second weighted risk parameter value may be generated based on the second risk parameter value and the second weight by virtue of the first user profile having the second attribute value for the second user attribute. Operation 212 may be performed by one or more hardware processors configured by machine-readable instructions including a component that is the same as or similar to assessment component 115, in accordance with one or more implementations.

An operation 214 may include generating aggregate risk parameter values for the user profiles by aggregating the weighted risk parameter values and/or performing other operations. By way of non-limiting illustration, a first aggregate risk parameter value may be generated from one or more of the first weighted risk parameter value, the second weighted risk parameter value, and/or other values. Operation 214 may be performed by one or more hardware processors configured by machine-readable instructions including a component that is the same as or similar to assessment component 115, in accordance with one or more implementations.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system configured to facilitate due diligence procedures through an online due diligence platform, the system comprising:
    non-transitory electronic storage storing encrypted information, the encrypted information including:
        user profiles associated with users of an online due diligence platform, individual user profiles including attribute values for user attributes, the user attributes characterizing the users and/or authenticated content items associated with the users, such that the user profiles include a first user profile associated with a first user, the first user profile including a first attribute value for a first user attribute and a second attribute value for a second user attribute; and
    one or more physical processors configured by machine-readable instructions to:
        generate, by a server hosting the online due diligence platform, user interface information defining a user interface through which risk profiles are defined by compliance organizations utilizing the online due diligence platform to carry out one or more due diligence procedures, individual risk profiles including valuation information and weighting information, the valuation information including risk parameter values for risk parameters assigned to the user profiles as a function of the attribute values for the user attributes within the user profiles, the weighting information including different weights associated with individual risk parameters;
        establish one or more network connections between the server and a set of remotely-located computing platforms associated with the compliance organizations;
        effectuate communication of the user interface information from the server to the set of remotely-located computing platforms associated with the compliance organizations over the one or more network connections to cause the set of remotely-located computing platforms to present instances of the user interface, such that communication of the user interface information to a first remotely-located computing platform associated with a first compliance organization is effectuated to cause the first remotely-located computing platform to present an instance of the user interface through which the first compliance organization defines a first risk profile;
        obtain, by the server, user input information conveying user input into the instances of the user interface presented by the set of remotely-located computing platforms associated with the compliance organizations, the user input including definitions of the valuation information and the weighting information of the individual risk profiles, such that the user input information conveys first user input into the instance of the user interface by the first compliance organization, the first user input defining first valuation information and first weighting information for the first risk profile, the first valuation information including a first risk parameter value for a first risk parameter that is assigned as a function of the first user attribute having the first attribute value, and a second risk parameter value for a second risk parameter that is assigned as a function of the second user attribute having the second attribute value, and the first weighting information including a first weight associated with the first risk parameter and a second weight associated with the second risk parameter;
        obtain, by the server, requests submitted through the set of remotely-located computing platforms associated with the compliance organizations to verify the users as part of the one or more due diligence procedures, individual ones of the requests identifying individual ones of the user profiles and including request criteria indicating information from the user profiles that is required as part of the requests, the requests including a first request by the first compliance organization, the first request identifying the first user profile and including a first set of request criteria indicating the attribute values for the first user attribute and the second user attribute are required;
        in response to obtaining the requests, generate, by the server, sets of weighted risk parameter values for the user profiles based on the risk profiles and the information from the user profiles that satisfy the request criteria of the requests, such that a first weighted risk parameter value and a second weighted risk parameter value are generated for the first user profile in response to obtaining the first request, wherein the first weighted risk parameter value is generated based on the first risk parameter value and the first weight by virtue of the first user profile having the first attribute value for the first user attribute, and the second weighted risk parameter value is generated based on the second risk parameter value and the second weight by virtue of the first user profile having the second attribute value for the second user attribute;

generate, by the server, aggregate risk parameter values for the user profiles by aggregating the weighted risk parameter values, such that a first aggregate risk parameter value is generated from the first weighted risk parameter value and the second weighted risk parameter value;

grant access to the encrypted information in the non-transitory electronic storage by individual remotely-located client computing platforms associated with individual compliance organizations to facilitate presentation of the information from the user profiles that satisfy the request criteria of the requests at the individual remotely-located client computing platforms associated with the individual compliance organizations;

in response to granting access, decrypt the information from the user profiles that satisfy the request criteria of the requests based on encryption keys associated with the user profiles so that the information from the individual ones of the user profiles is made available for presentation at the individual remotely-located client computing platforms associated with the individual compliance organizations;

generate, by the server, second user interface information defining a second user interface through which the user profiles are accessed, the aggregate risk parameter values are displayed, and the authenticated content items are accessed, the second user interface being configured to display the information of the user profiles that satisfy the request criteria which has been decrypted for presentation;

effectuate communication of the second user interface information from the server to the set of remotely-located computing platforms associated with the compliance organizations over the one or more network connections to cause the set of remotely-located computing platforms to present instances of the second user interface displaying the information of the user profiles that satisfy the request criteria and the aggregate risk parameter values, such that communication of the second user interface information to the first remotely-located computing platform associated with the first compliance organization is effectuated to cause the first remotely-located computing platform to present an instance of the second user interface displaying the first attribute value, the second attribute value, and the first aggregate risk parameter value, the second user interface further including a selectable user interface element configured to cause presentation of a first authenticated content item associated with the first user profile, such that selection of the selectable user interface element in the instance of the second user interface presented by the first remotely-located computing platform causes the second user interface to display a window presenting the first authenticated content item;

wherein generating the second user interface information includes accessing the non-transitory electronic storage, decrypting the information from the user profiles that satisfy the request criteria, and generating visual content items representing the aggregate risk parameter values, individual ones of the visual content items being displayed as part of individual instances of the second user interface, such that a first visual content item representing the first aggregate risk parameter value is generated and displayed in the instance of the second user interface presented by the first remotely-located computing platform; and wherein the visual content items are representative of the aggregate risk parameter values through one or more of color-coding, text-based indicia, or graphical indicators.

2. The system of claim 1, wherein the first visual content item representing the first aggregate risk parameter value is a sliding scale graphic indicator, the sliding scale graphic indicator including a visual scale element and a visual slider element, wherein a position of the visual slider element relative to the visual scale element is representative of the first aggregate risk parameter value.

3. The system of claim 1, wherein the one or more physical processors are further configured by the machine-readable instructions to:

generate third user interface information defining a third user interface through which the users provide responses to a prompted series of questions;

effectuate communication of the third user interface information to a second set of remotely-located computing platforms associated with the users to cause the second set of remotely-located computing platforms associated with the users to present instances of the third user interface displaying the prompted series of questions;

obtain response information conveying responses to one or more questions in the prompted series of questions by one or more of the users; and generate one or more of the attribute values for one or more of the user attributes of one or more of the user profiles based on the responses conveyed in the response information.

4. The system of claim 3, wherein the one or more physical processors are further configured by the machine-readable instructions to:

generate fourth user interface information defining a fourth user interface through which the compliance organizations generate individual questions in the prompted series of questions to be included the third user interface;

effectuate communication of the fourth user interface information to the set of remotely-located computing platforms associated with the compliance organizations to cause the set of remotely-located computing platforms to present instances of the fourth user interface;

obtain second user input information conveying second user input into the instances of the fourth user interface by the compliance organizations, the second user input including entry and/or selection of the individual questions in the prompted series of questions; and generate the third user interface information based on the second user input information.

5. The system of claim 1, wherein the individual risk profiles are associated with individual entity types of the users.

6. The system of claim 5, wherein entity types include individual persons and individual business entities.

7. The system of claim 1, wherein the one or more physical processors are further configured by the machine-readable instructions to:

generate third user interface information defining a third user interface through which the sets of weighted risk parameter values for the user profiles are displayed; and effectuate communication of the third user interface information to the set of remotely-located computing platforms associated with the compliance organizations to cause the set of remotely-located computing platforms to present instances of the third user interface displaying the sets of weighted risk parameter values for the user profiles, such that communication of the third user interface information to the first remotely-located computing platform associated with the first compliance organization is effectuated to cause the first remotely-located computing platform to present an instance of the third user interface displaying the first weighted risk parameter value and the second weighted risk parameter value generated for the first user profile.

8. The system of claim 1, wherein the first risk parameter value for the first risk parameter that is assigned as a function of the first user attribute having a first range of attribute values, and wherein the first attribute value falls within the first range of attribute values.

9. A method to facilitate due diligence procedures through an online platform, the method being implemented by a computer system, the method comprising:

storing, within non-transitory electronic storage, encrypted information, the encrypted information including user profiles associated with users of an online due diligence platform, individual user profiles including attribute values for user attributes, the user attributes characterizing the users and/or authenticated content items associated with the users, the user profiles including a first user profile associated with a first user, the first user profile including a first attribute value for a first user attribute and a second attribute value for a second user attribute;

generating, by a server hosting the online due diligence platform, user interface information defining a user interface through which risk profiles are defined by compliance organizations utilizing the online due diligence platform to carry out one or more due diligence procedures, individual risk profiles including valuation information and weighting information, the valuation information including risk parameter values for risk parameters assigned to the user profiles as a function of the attribute values for the user attributes within the user profiles, the weighting information including different weights associated with individual risk parameters;

establishing one or more network connections between the server and a set of remotely-located computing platforms associated with the compliance organizations;

effectuating communication of the user interface information from the server to the set of remotely-located computing platforms associated with the compliance organizations over the one or more network connections to cause the set of remotely-located computing platforms to present instances of the user interface, including effectuating communication of the user interface information to a first remotely-located computing platform associated with a first compliance organization to cause the first remotely-located computing platform to present an instance of the user interface through which the first compliance organization defines a first risk profile;

obtaining, by the server, user input information conveying user input into the instances of the user interface presented by the set of remotely-located computing platforms associated with the compliance organizations, the user input including definitions of the valuation information and the weighting information of the individual risk profiles, the user input information conveying first user input into the instance of the user interface by the first compliance organization, the first user input defining first valuation information and first weighting information for the first risk profile, the first valuation information including a first risk parameter value for a first risk parameter that is assigned as a function of the first user attribute having the first attribute value, and a second risk parameter value for a second risk parameter that is assigned as a function of the second user attribute having the second attribute value, and the first weighting information including a first weight associated with the first risk parameter and a second weight associated with the second risk parameter;

obtaining, by the server, requests submitted through the set of remotely-located computing platforms associated with the compliance organizations to verify the users as part of the one or more due diligence procedures, individual ones of the requests identifying individual ones of the user profiles and including request criteria indicating information from the user profiles that is required as part of the requests, the requests including a first request by the first compliance organization, the first request identifying the first user profile and including a first set of request criteria indicating the attribute values for the first user attribute and the second user attribute are required;

in response to obtaining the requests, generating, by the server, sets of weighted risk parameter values for the user profiles based on the risk profiles and the information from the user profiles that satisfy the request criteria of the requests, including generating a first weighted risk parameter value and a second weighted risk parameter value for the first user profile in response to obtaining the first request, wherein the first weighted risk parameter value is generated based on the first risk parameter value and the first weight by virtue of the first user profile having the first attribute value for the first user attribute, and the second weighted risk parameter value is generated based on the second risk parameter value and the second weight by virtue of the first user profile having the second attribute value for the second user attribute;

generating, by the server, aggregate risk parameter values for the user profiles by aggregating the weighted risk parameter values, including generating a first aggregate risk parameter value from the first weighted risk parameter value and the second weighted risk parameter value;

granting access to the encrypted information in the non-transitory electronic storage by individual remotely-located client computing platforms associated with individual compliance organizations to facilitate presentation of the information from the user profiles that satisfy the request criteria of the requests at the individual remotely-located client computing platforms associated with the individual compliance organizations;

in response to the granting access, decrypting the information from the user profiles that satisfy the request criteria of the requests based on encryption keys associated with the user profiles so that the information from the individual ones of the user profiles is made available for presentation at the individual remotely-located client computing platforms associated with the individual compliance organizations;

generating, by the server, second user interface information defining a second user interface through which the user profiles are accessed, the aggregate risk parameter values are displayed, and the authenticated content items are accessed, the second user interface being configured to display the information of the user profiles that satisfy the request criteria which has been decrypted for presentation;

effectuating communication of the second user interface information from the server to the set of remotely-located computing platforms associated with the compliance organizations over the one or more network connections to cause the set of remotely-located computing platforms to present instances of the second user interface displaying the information of the user profiles that satisfy the request criteria and the aggregate risk parameter values, including effectuating communication of the second user interface information to the first remotely-located computing platform associated with the first compliance organization to cause the first remotely-located computing platform to present an instance of the second user interface displaying the first attribute value, the second attribute value, and the first aggregate risk parameter value, the second user interface further including a selectable user interface element configured to cause presentation of a first authenticated content item associated with the first user profile, such that selection of the selectable user interface element in the instance of the second user interface presented by the first remotely-located computing platform causes the second user interface to display a window presenting the first authenticated content item;

wherein the generating the second user interface information includes accessing the non-transitory electronic storage, decrypting the information from the user profiles that satisfy the request criteria, and generating visual content items representing the aggregate risk parameter values, individual ones of the visual content items being displayed as part of individual instances of the second user interface, including generating a first visual content item representing the first aggregate risk parameter value and displaying the first visual content item in the instance of the second user interface presented by the first remotely-located computing platform; and wherein the visual content items are representative of the aggregate risk parameter values through one or more of color-coding, text-based indicia, or graphical indicators.

10. The method of claim 9, wherein the first visual content item representing the first aggregate risk parameter value is a sliding scale graphic indicator, the sliding scale graphic indicator including a visual scale element and a visual slider element, wherein a position of the visual slider element relative to the visual scale element is representative of the first aggregate risk parameter value.

11. The method of claim 9, further comprising:
generating third user interface information defining a third user interface through which the users provide responses to a prompted series of questions;

effectuating communication of the third user interface information to a second set of remotely-located computing platforms associated with the users to cause the second set of remotely-located computing platforms associated with the users to present instances of the third user interface displaying the prompted series of questions; obtaining response information conveying responses to one or more questions in the prompted series of questions by one or more of the users; and generating one or more of the attribute values for one or more of the user attributes of one or more of the user profiles based on the responses conveyed in the response information.

12. The method of claim 11, further comprising:
generating fourth user interface information defining a fourth user interface through which the compliance organizations generate individual questions in the prompted series of questions to be included the third user interface;

effectuating communication of the fourth user interface information to the set of remotely-located computing platforms associated with the compliance organizations to cause the set of remotely-located computing platforms to present instances of the fourth user interface;

obtaining second user input information conveying second user input into the instances of the fourth user interface by the compliance organizations, the second user input including entry and/or selection of the individual questions in the prompted series of questions; and generating the third user interface information based on the second user input information.

13. The method of claim 9, wherein the individual risk profiles are associated with individual entity types of the users.

14. The method of claim 13, wherein entity types include individual persons and individual business entities.

15. The method of claim 9, further comprising:
generating third user interface information defining a third user interface through which the sets of weighted risk parameter values for the user profiles are displayed; and effectuating communication of the third user interface information to the set of remotely-located computing platforms associated with the compliance organizations to cause the set of remotely-located computing platforms to present instances of the third user interface displaying the sets of weighted risk parameter values for the user profiles, including effectuating communication of the third user interface information to the first remotely-located computing platform associated with the first compliance organization to cause the first remotely-located computing platform to present an instance of the third user interface displaying the first weighted risk parameter value and the second weighted risk parameter value generated for the first user profile.

16. The method of claim 9, wherein the first risk parameter value for the first risk parameter that is assigned as a function of the first user attribute having a first range of attribute values, and wherein the first attribute value falls within the first range of attribute values.

17. The system of claim 1, wherein the individual ones of the user profiles are associated with individual combinations of public and private keys.

18. The method of claim 9, wherein the individual ones of the user profiles are associated with individual combinations of public and private keys.

* * * * *